United States Patent
Ogawa et al.

(10) Patent No.: US 11,196,702 B2
(45) Date of Patent: Dec. 7, 2021

(54) IN-VEHICLE COMMUNICATION DEVICE, AND COMMUNICATION CONTROL METHOD

(71) Applicants: Sumitomo Electric Industries, Ltd., Osaka (JP); AutoNetworks Technologies, Ltd., Yokkaichi (JP); Sumitomo Wiring Systems, Ltd., Yokkaichi (JP)

(72) Inventors: Akihiro Ogawa, Osaka (JP); Hideki Maeda, Osaka (JP); Hirofumi Urayama, Osaka (JP); Takeshi Hagihara, Yokkaichi (JP); Yasuhiro Yabuuchi, Yokkaichi (JP)

(73) Assignees: Sumitomo Electric Industries, Ltd., Osaka (JP); AutoNetworks Technologies, Ltd., Yokkaichi (JP); Sumitomo Wiring Systems, Ltd., Yokkaichi (JP)

( * ) Notice: Subject to any disclaimer, the term of this patent is extended or adjusted under 35 U.S.C. 154(b) by 37 days.

(21) Appl. No.: 16/625,289

(22) PCT Filed: Mar. 20, 2018

(86) PCT No.: PCT/JP2018/011097
§ 371 (c)(1),
(2) Date: Dec. 20, 2019

(87) PCT Pub. No.: WO2018/235365
PCT Pub. Date: Dec. 27, 2018

(65) Prior Publication Data
US 2020/0220838 A1    Jul. 9, 2020

(30) Foreign Application Priority Data

Jun. 23, 2017 (JP) .............................. JP2017-123070

(51) Int. Cl.
*H04L 12/28* (2006.01)
*H04L 29/12* (2006.01)
(Continued)

(52) U.S. Cl.
CPC .......... *H04L 61/10* (2013.01); *H04L 61/2521* (2013.01); *H04L 61/6022* (2013.01);
(Continued)

(58) Field of Classification Search
CPC . H04L 61/10; H04L 61/2521; H04L 61/6022; H04L 63/0876; H04L 63/1466;
(Continued)

(56) References Cited

U.S. PATENT DOCUMENTS

2013/0074164 A1* 3/2013 Bartlett ............... H04L 63/0876
726/5
2013/0111589 A1* 5/2013 Cho ..................... H04L 61/103
726/23
(Continued)

FOREIGN PATENT DOCUMENTS

JP    2013-168865 A    8/2013

*Primary Examiner* — Lan-Huong Truong
(74) *Attorney, Agent, or Firm* — Baker Botts L.L.P.; Michael A. Sartori

(57) ABSTRACT

An in-vehicle communication device is an in-vehicle communication device that performs a relay process of relaying data between functional units in an in-vehicle network, and includes a communication unit that performs the relay process using correspondence information indicating a correspondence relation between an Internet protocol (IP) address and a media access control (MAC) address of one or more functional units, an address managing unit that generates the correspondence information, and an authenticating unit that performs an authentication process for the functional unit, in which the authenticating unit performs the authentication process for the functional unit in which an IP (Continued)

address and a MAC address are newly registered in the correspondence information by the address managing unit, and the address managing unit deletes the correspondence relation of the functional unit from the correspondence information when the authentication process for the newly registered functional unit is not successfully performed.

9 Claims, 17 Drawing Sheets

(51) Int. Cl.
  *H04W 4/48* (2018.01)
  *H04L 29/06* (2006.01)
  *H04W 84/18* (2009.01)
(52) U.S. Cl.
  CPC .......... *H04L 63/0876* (2013.01); *H04W 4/48* (2018.02); *H04W 84/18* (2013.01)
(58) Field of Classification Search
  CPC ... H04L 63/0236; H04L 61/103; H04L 12/28; H04W 4/48; H04W 84/18
  See application file for complete search history.

(56) References Cited

U.S. PATENT DOCUMENTS

| | | | | |
|---|---|---|---|---|
| 2013/0201316 | A1* | 8/2013 | Binder | .................... H04L 67/12 |
| | | | | 348/77 |
| 2014/0016003 | A1* | 1/2014 | Oizumi | ................. H04L 67/141 |
| | | | | 348/231.9 |
| 2017/0118321 | A1* | 4/2017 | Buttolo | ............... H04M 1/6091 |

* cited by examiner

FIG. 4

| TRANSMISSION DESTINATION MAC ADDRESS | OUTPUT DESTINATION (LOGICAL PORT NUMBER) |
|---|---|
| MAC ADDRESS OF AUTOMATED DRIVING ECU 111A | #1 |
| MAC ADDRESS OF SENSOR 111B | #2 |
| MAC ADDRESS OF NAVIGATION DEVICE 111C | #3 |
| MAC ADDRESS OF IN-VEHICLE COMMUNICATION DEVICE 101 | #0 |

FIG. 5

| IP ADDRESS | MAC ADDRESS |
|---|---|
| IP-A | MAC-A |
| IP-B | MAC-B |

FIG. 7

| IP ADDRESS | MAC ADDRESS |
|---|---|
| IP-A | MAC-A |
| IP-B | MAC-B |
| IP-D | MAC-D |

FIG. 8

| IP ADDRESS | MAC ADDRESS |
|---|---|
| IP-A | MAC-X |
| IP-B | MAC-B |

FIG. 11

| IP ADDRESS | MAC ADDRESS |
|---|---|
| IPv6-A | MAC-A |
| IPv6-B | MAC-B |
| IPv6-D | MAC-D |

FIG. 16

| IP ADDRESS | MAC ADDRESS |
|------------|-------------|
| IPv6-A     | MAC-X       |
| IPv6-B     | MAC-B       |

IN-VEHICLE COMMUNICATION DEVICE, AND COMMUNICATION CONTROL METHOD

CROSS-REFERENCE TO RELATED APPLICATIONS

This application is the national phase under 35 U.S.C. § 371 of PCT International Application No. PCT/JP2018/011097 which has an International filing date of Mar. 20, 2018 and designated the United States of America.

FIELD

The present disclosure relates to an in-vehicle communication device, and a communication control method.

This application claims the benefit of Japanese Patent Application No. 2017-123070 filed on Jun. 23, 2017, the entire contents of which are incorporated herein by reference.

BACKGROUND

The following in-vehicle network system is disclosed in Japanese Patent Laid-Open Publication No. 2013-168865.

That is, the in-vehicle network system includes an in-vehicle control device including a memory that stores definition data defining a portion depending on an implementation on an in-vehicle network in a communication protocol used on the in-vehicle network and a communication protocol issuing device that issues the definition data to the in-vehicle control device. Upon receiving a registration request for requesting the in-vehicle control device to participate in the in-vehicle network from a registering device that causes the in-vehicle control device to participate in the in-vehicle network, the communication protocol issuing device performs authentication on the registering device, generates the definition data conforming to the implementation on the in-vehicle network, and transmits the definition data to the registering device. The registering device receives the definition data transmitted from the communication protocol issuing device, and requests the in-vehicle control device to store the received definition data in the memory. Then, the in-vehicle control device receives the definition data from the registering device, stores the definition data in the memory, and performs communication using the in-vehicle network in conformity to the communication protocol in accordance with the portion defined by the definition data.

SUMMARY (1) An in-vehicle communication device of the present disclosure is an in-vehicle communication device that performs a relay process of relaying data between functional units in an in-vehicle network, including: a communication unit that performs the relay process using correspondence information indicating a correspondence relation between an IP address and a MAC address of one or more functional units; an address managing unit that generates the correspondence information; and an authenticating unit that performs an authentication process for the functional unit, in which the authenticating unit performs the authentication process for the functional unit in which an IP address and a MAC address are newly registered in the correspondence information by the address managing unit, and the address managing unit deletes the correspondence relation of the functional unit from the correspondence information when the authentication process for the newly registered functional unit is not successfully performed.

(5) An in-vehicle communication device of the present disclosure is an in-vehicle communication device that performs a relay process of relaying data between functional units in an in-vehicle network, including: a communication unit that performs the relay process using correspondence information indicating a correspondence relation between an IP address and a MAC address of one or more functional units; and an address managing unit that generates the correspondence information, in which the address managing unit registers a correspondence relation between a transmission source IP address and a transmission source MAC address included in a data field of a frame of a layer 2 received from the functional unit via the communication unit in the correspondence information, and the address managing unit does not register the correspondence relation in the correspondence information or deletes the correspondence relation from the correspondence information when the transmission source MAC address does not coincide with a transmission source MAC address included in a header of the frame.

(6) An in-vehicle communication device of the present disclosure is an in-vehicle communication device that performs a relay process of relaying data between functional units in an in-vehicle network, including: a communication unit that performs the relay process using correspondence information indicating a correspondence relation between an IP address and a MAC address of one or more functional units; an address managing unit that generates the correspondence information; and an authenticating unit that performs an authentication process for the functional unit, in which the authenticating unit performs the authentication process for the functional unit in which an IP address and a MAC address are newly registered in the correspondence information by the address managing unit, and the address managing unit does not permit rewriting of the newly registered correspondence relation until a predetermined condition is satisfied after the authentication process for the newly registered functional unit is successfully performed.

(7) A communication control method of the present disclosure is a communication control method in an in-vehicle communication device that performs a relay process of relaying data between functional units in an in-vehicle network, including: a step of performing the relay process using correspondence information indicating a correspondence relation between an IP address and a MAC address of one or more functional units; a step of generating the correspondence information; and a step of performing an authentication process for the functional unit, in which, in the step of generating the correspondence information, an IP address and a MAC address are newly registered in the correspondence information, in the step of performing the authentication process, the authentication process is performed for the functional unit in which an IP address and a MAC address are newly registered in the correspondence information, and the communication control method further includes a step of deleting the correspondence relation of the functional unit from the correspondence information when the authentication process for the newly registered functional unit is not successfully performed.

(8) A communication control method of the present disclosure is a communication control method in an in-vehicle communication device that performs a relay process of relaying data between functional units in an in-vehicle network, including: a step of performing the relay process using correspondence information indicating a correspondence relation between an IP address and a MAC address of one or more functional units; and a step of generating the correspondence information, in which, in the step of generating the correspondence information, a correspondence relation between a transmission source IP address and a transmission source MAC address included in a data field of a frame of a layer 2 received from the functional unit is registered in the correspondence information, and the communication control method further includes a step of not registering the correspondence relation in the correspondence information or deleting the correspondence relation from the correspondence information when the transmission source MAC address does not coincide with a transmission source MAC address included in a header of the frame.

(9) A communication control method of the present disclosure is a communication control method in an in-vehicle communication device that performs a relay process of relaying data between functional units in an in-vehicle network, including: a step of performing the relay process using correspondence information indicating a correspondence relation between an IP address and a MAC address of one or more functional units; a step of generating the correspondence information; and a step of performing an authentication process for the functional unit, in which, in the step of generating the correspondence information, an IP address and a MAC address are newly registered in the correspondence information, in the step of performing the authentication process, the authentication process is performed for the functional unit in which an IP address and a MAC address are newly registered in the correspondence information, and the communication control method further includes a step of not permitting rewriting of the newly registered correspondence relation until a predetermined condition is satisfied after the authentication process for the newly registered functional unit is successfully performed.

(10) A computer readable non-transitory recording medium of the present disclosure is a computer readable non-transitory recording medium recording a communication control program used in an in-vehicle communication device that performs a relay process of relaying data between functional units in an in-vehicle network, the communication control program causing a computer to function as: a communication unit that performs the relay process using correspondence information indicating a correspondence relation between an IP address and a MAC address of one or more functional units; an address managing unit that generates the correspondence information; and an authenticating unit that performs an authentication process for the functional unit, in which the authenticating unit performs the authentication process for the functional unit in which an IP address and a MAC address are newly registered in the correspondence information by the address managing unit, and the address managing unit deletes the correspondence relation of the functional unit from the correspondence information when the authentication process for the newly registered functional unit is not successfully performed.

(11) A computer readable non-transitory recording medium of the present disclosure is a computer readable non-transitory recording medium recording a communication control program used in an in-vehicle communication device that performs a relay process of relaying data between functional units in an in-vehicle network, the communication control program causing a computer to function as: a communication unit that performs the relay process using correspondence information indicating a correspondence relation between an IP address and a MAC address of one or more functional units; and an address managing unit that generates the correspondence information, in which the address managing unit registers a correspondence relation between a transmission source IP address and a transmission source MAC address included in a data field of a frame of a layer 2 received from the functional unit via the communication unit in the correspondence information, and the address managing unit does not register the correspondence relation in the correspondence information or deletes the correspondence relation from the correspondence information when the transmission source MAC address does not coincide with a transmission source MAC address included in a header of the frame.

(12) A computer readable non-transitory recording medium of the present disclosure is a computer readable non-transitory recording medium recording a communication control program used in an in-vehicle communication device that performs a relay process of relaying data between functional units in an in-vehicle network, the communication control program causing a computer to function as: a communication unit that performs the relay process using correspondence information indicating a correspondence relation between an IP address and a MAC address of one or more functional units; an address managing unit that generates the correspondence information; and an authenticating unit that performs an authentication process for the functional unit, in which the authenticating unit performs the authentication process for the functional unit in which an IP address and a MAC address are newly registered in the correspondence information by the address managing unit, and the address managing unit does not permit rewriting of the newly registered correspondence relation until a predetermined condition is satisfied after the authentication process for the newly registered functional unit is successfully performed.

One aspect of the present disclosure can be realized not only as an in-vehicle communication device including such a characteristic processing unit but also as an in-vehicle communication system including an in-vehicle communication device. Further, one aspect of the present disclosure can be realized as a semiconductor integrated circuit that realizes a part or all of the in-vehicle communication device.

The above and further objects and features of the invention will more fully be apparent from the following detailed description with accompanying drawings.

BRIEF DESCRIPTION OF THE DRAWINGS

FIG. 4 is a diagram illustrating an example of an ARL table held in an L2 switch unit in the in-vehicle communication device according to the first embodiment of the present disclosure.

FIG. 5 is a diagram illustrating an example of an ARP table held in an L3 relay unit in the in-vehicle communication device according to the first embodiment of the present disclosure.

FIG. 7 is a diagram illustrating an example of an ARP table held in an L3 relay unit in the in-vehicle communication device according to the first embodiment of the present disclosure.

FIG. 8 is a diagram illustrating an example of an ARP table held in an L3 relay unit in the in-vehicle communication device according to the first embodiment of the present disclosure.

FIG. 11 is a diagram illustrating an example of an ND cache held in an L3 relay unit of an in-vehicle communication device in the modified example of the in-vehicle communication system according to the first embodiment of the present disclosure.

FIG. 16 is a diagram illustrating an example of an ND cache held in an L3 relay unit in the in-vehicle communication device according to the second embodiment of the present disclosure.

Figure 1:
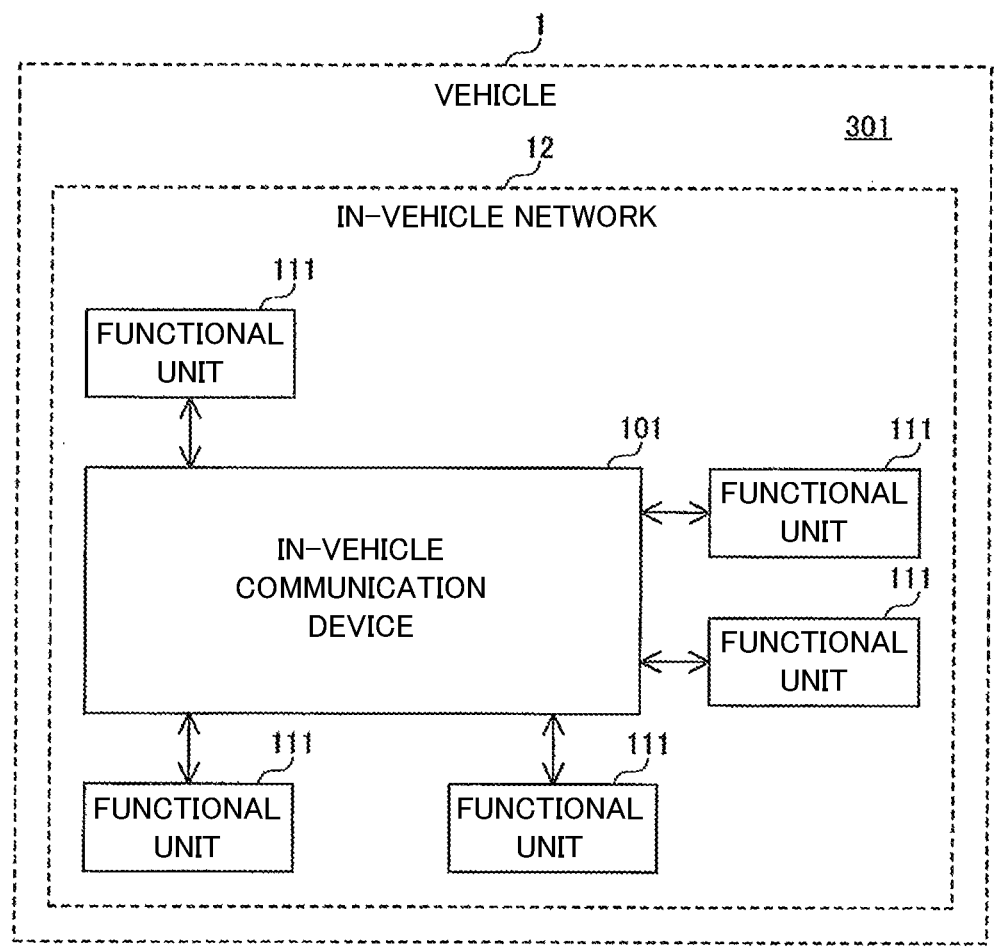
FIG. 1 is a diagram illustrating a configuration of an in-vehicle communication system according to a first embodiment of the present disclosure.

In the past, an in-vehicle network system for improving security in an in-vehicle network has been developed.

In the in-vehicle network disclosed in Japanese Patent Laid-Open Publication No. 2013-168865, a communication gateway that relays data from the in-vehicle control device is disposed.

For example, when the communication gateway performs a layer 3 (L3) relay process, correspondence information indicating a correspondence relation between an Internet protocol (IP) address and a media access control (MAC) address of the in-vehicle control device is used. If the correspondence information is altered without authorization, data from the in-vehicle control device will not be relayed properly, and thus communication is not normally performed in the in-vehicle network.

The present disclosure was made to solve the above-described problems, and it is an object of the present disclosure to provide an in-vehicle communication device, a communication control method, and a communication control program which are capable of providing satisfactory communication in the in-vehicle network.

According to the present disclosure, satisfactory communication can be provided in the in-vehicle network.

First, exemplary embodiments of the present disclosure will be described.

(1) An in-vehicle communication device according to an embodiment of the present disclosure is an in-vehicle communication device that performs a relay process of relaying data between functional units in an in-vehicle network, including: a communication unit that performs the relay process using correspondence information indicating a correspondence relation between an IP address and a MAC address of one or more functional units; an address managing unit that generates the correspondence information; and an authenticating unit that performs an authentication process for the functional unit, in which the authenticating unit performs the authentication process for the functional unit in which an IP address and a MAC address are newly registered in the correspondence information by the address managing unit, and the address managing unit deletes the correspondence relation of the functional unit from the correspondence information when the authentication process for the newly registered functional unit is not successfully performed.

When the authentication process for the newly registered functional unit is not successfully performed, the functional unit is considered to be an unauthorized functional unit. With the above configuration, for example, even when the unauthorized functional unit pretended to be a legitimate functional unit, and an erroneous correspondence relation is registered in the correspondence information, it is possible to delete the erroneous correspondence relation from the correspondence information, and it is possible to prevent the relay process using the erroneous correspondence relation from being continued. Accordingly, the data from the functional unit can be relayed correctly. Therefore, the satisfactory communication can be provided in the in-vehicle network.

(2) Preferably, the address managing unit registers a correspondence relation between a transmission source IP address and a transmission source MAC address included in a data field of a frame of a layer 2 received from the functional unit via the communication unit in the correspondence information, and the address managing unit does not register the correspondence relation in the correspondence information or deletes the correspondence relation from the correspondence information when the transmission source MAC address does not coincide with a transmission source MAC address included in a header of the frame.

When the transmission source MAC address included in the data field does not coincide with the transmission source MAC address included in the header, the frame is likely to be an unauthorized frame. With the above configuration, it is possible to prevent the erroneous correspondence relation between the transmission source IP address and the transmission source MAC address included in the data field of the unauthorized frame from continuing to be registered in the correspondence information, and thus it is possible to prevent the relay process using the erroneous correspondence relation from continuing.

(3) Preferably, the address managing unit does not permit rewriting of the newly registered correspondence relation until a predetermined condition is satisfied after the authentication process for the newly registered functional unit is successfully performed.

When the authentication process for the newly registered functional unit is successfully performed, the functional unit is considered to be a legitimate functional unit. With the above configuration, since the newly registered correct correspondence relation can be protected until the predetermined condition is satisfied, the relay process using the correct correspondence relation can be continued until at least the predetermined condition is satisfied.

(4) More preferably, the predetermined condition is a condition that communication of the newly registered functional unit is interrupted for a predetermined period or more.

With such a configuration, it is possible to continue the data relay process of the legitimate functional unit using the correct correspondence relation while the communication with the newly registered legitimate functional unit is being continued.

(5) An in-vehicle communication device according to an embodiment of the present disclosure is an in-vehicle communication device that performs a relay process of relaying data between functional units in an in-vehicle network, including: a communication unit that performs the relay process using correspondence information indicating a correspondence relation between an IP address and a MAC address of one or more functional units; and an address managing unit that generates the correspondence information, in which the address managing unit registers a correspondence relation between a transmission source IP address and a transmission source MAC address included in a data field of a frame of a layer 2 received from the functional unit via the communication unit in the correspondence information, and the address managing unit does not register the correspondence relation in the correspondence information or deletes the correspondence relation from the correspondence information when the transmission source MAC address does not coincide with a transmission source MAC address included in a header of the frame.

When the transmission source MAC address included in the data field does not coincide with the transmission source MAC address included in the header, the frame is likely to be an unauthorized frame. With the above configuration, it is possible to prevent the erroneous correspondence relation between the transmission source IP address and the transmission source MAC address included in the data field of the unauthorized frame from continuing to be registered in the correspondence information, and thus it is possible to prevent the relay process using the erroneous correspondence relation from continuing. Accordingly, the data from the functional unit can be relayed correctly. Therefore, the satisfactory communication can be provided in the in-vehicle network.

(6) An in-vehicle communication device according to an embodiment of the present disclosure is an in-vehicle communication device that performs a relay process of relaying data between functional units in an in-vehicle network, including: a communication unit that performs the relay process using correspondence information indicating a correspondence relation between an IP address and a MAC address of one or more functional units; an address managing unit that generates the correspondence information; and an authenticating unit that performs an authentication process for the functional unit, in which the authenticating unit performs the authentication process for the functional unit in which an IP address and a MAC address are newly registered in the correspondence information by the address managing unit, and the address managing unit does not permit rewriting of the newly registered correspondence relation until a predetermined condition is satisfied after the authentication process for the newly registered functional unit is successfully performed.

When the authentication process for the newly registered functional unit is successfully performed, the functional unit is considered to be a legitimate functional unit. With the above configuration, since the newly registered correct correspondence relation can be protected until the predetermined condition is satisfied, the relay process using the correct correspondence relation can be continued until at least the predetermined condition is satisfied. Accordingly, the data from the functional unit can be relayed correctly. Therefore, the satisfactory communication can be provided in the in-vehicle network.

(7) A communication control method according to an embodiment of the present disclosure is a communication control method in an in-vehicle communication device that performs a relay process of relaying data between functional units in an in-vehicle network, including: a step of performing the relay process using correspondence information indicating a correspondence relation between an IP address and a MAC address of one or more functional units; a step of generating the correspondence information; and a step of performing an authentication process for the functional unit, in which, in the step of generating the correspondence information, an IP address and a MAC address are newly registered in the correspondence information, in the step of performing the authentication process, the authentication process is performed for the functional unit in which an IP address and a MAC address are newly registered in the correspondence information, and the communication control method further includes a step of deleting the correspondence relation of the functional unit from the correspondence information when the authentication process for the newly registered functional unit is not successfully performed.

When the authentication process for the newly registered functional unit is not successfully performed, the functional unit is considered to be an unauthorized functional unit. With the above configuration, for example, even when the unauthorized functional unit pretended to be a legitimate functional unit, and an erroneous correspondence relation is registered in the correspondence information, it is possible to delete the erroneous correspondence relation from the correspondence information, and it is possible to prevent the relay process using the erroneous correspondence relation from being continued. Accordingly, the data from the functional unit can be relayed correctly. Therefore, the satisfactory communication can be provided in the in-vehicle network.

(8) A communication control method according to an embodiment of the present disclosure is a communication control method in an in-vehicle communication device that performs a relay process of relaying data between functional units in an in-vehicle network, including: a step of performing the relay process using correspondence information indicating a correspondence relation between an IP address and a MAC address of one or more functional units; and a step of generating the correspondence information, in which, in the step of generating the correspondence information, a correspondence relation between a transmission source IP address and a transmission source MAC address included in a data field of a frame of a layer 2 received from the functional unit is registered in the correspondence information, and the communication control method further includes a step of not registering the correspondence relation in the correspondence information or deleting the correspondence relation from the correspondence information when the transmission source MAC address does not coincide with a transmission source MAC address included in a header of the frame.

When the transmission source MAC address included in the data field does not coincide with the transmission source MAC address included in the header, the frame is likely to be an unauthorized frame. With the above configuration, it is possible to prevent the erroneous correspondence relation between the transmission source IP address and the transmission source MAC address included in the data field of the unauthorized frame from continuing to be registered in the correspondence information, and thus it is possible to prevent the relay process using the erroneous correspondence relation from continuing. Accordingly, the data from the functional unit can be relayed correctly. Therefore, the satisfactory communication can be provided in the in-vehicle network.

(9) A communication control method according to an embodiment of the present disclosure is a communication control method in an in-vehicle communication device that performs a relay process of relaying data between functional units in an in-vehicle network, including: a step of performing the relay process using correspondence information indicating a correspondence relation between an IP address and a MAC address of one or more functional units; a step of generating the correspondence information; and a step of performing an authentication process for the functional unit, in which, in the step of generating the correspondence information, an IP address and a MAC address are newly registered in the correspondence information, in the step of performing the authentication process, the authentication process is performed for the functional unit in which an IP address and a MAC address are newly registered in the correspondence information, and the communication control method further includes a step of not permitting rewriting of the newly registered correspondence relation until a predetermined condition is satisfied after the authentication process for the newly registered functional unit is successfully performed.

When the authentication process for the newly registered functional unit is successfully performed, the functional unit is considered to be a legitimate functional unit. With the above configuration, since the newly registered correct correspondence relation can be protected until the predetermined condition is satisfied, the relay process using the correct correspondence relation can be continued until at least the predetermined condition is satisfied. Accordingly, the data from the functional unit can be relayed correctly. Therefore, the satisfactory communication can be provided in the in-vehicle network.

(10) A computer readable non-transitory recording medium according to an embodiment of the present disclosure is a computer readable non-transitory recording medium recording a communication control program used in an in-vehicle communication device that performs a relay process of relaying data between functional units in an in-vehicle network, the communication control program causing a computer to function as: a communication unit that performs the relay process using correspondence information indicating a correspondence relation between an IP address and a MAC address of one or more functional units; an address managing unit that generates the correspondence information; and an authenticating unit that performs an authentication process for the functional unit, in which the authenticating unit performs the authentication process for the functional unit in which an IP address and a MAC address are newly registered in the correspondence information by the address managing unit, and the address managing unit deletes the correspondence relation of the functional unit from the correspondence information when the authentication process for the newly registered functional unit is not successfully performed.

When the authentication process for the newly registered functional unit is not successfully performed, the functional unit is considered to be an unauthorized functional unit. With the above configuration, for example, even when the unauthorized functional unit pretended to be a legitimate functional unit, and an erroneous correspondence relation is registered in the correspondence information, it is possible to delete the erroneous correspondence relation from the correspondence information, and it is possible to prevent the relay process using the erroneous correspondence relation from being continued. Accordingly, the data from the functional unit can be relayed correctly. Therefore, the satisfactory communication can be provided in the in-vehicle network.

(11) A computer readable non-transitory recording medium according to an embodiment of the present disclosure is a computer readable non-transitory recording medium recording a communication control program used in an in-vehicle communication device that performs a relay process of relaying data between functional units in an in-vehicle network, the communication control program causing a computer to function as: a communication unit that performs the relay process using correspondence information indicating a correspondence relation between an IP address and a MAC address of one or more functional units; and an address managing unit that generates the correspondence information, in which the address managing unit registers a correspondence relation between a transmission source IP address and a transmission source MAC address included in a data field of a frame of a layer 2 received from the functional unit via the communication unit in the correspondence information, and the address managing unit does not register the correspondence relation in the correspondence information or deletes the correspondence relation from the correspondence information when the transmission source MAC address does not coincide with a transmission source MAC address included in a header of the frame.

When the transmission source MAC address included in the data field does not coincide with the transmission source MAC address included in the header, the frame is likely to be an unauthorized frame. With the above configuration, it is possible to prevent the erroneous correspondence relation between the transmission source IP address and the transmission source MAC address included in the data field of the unauthorized frame from continuing to be registered in the correspondence information, and thus it is possible to prevent the relay process using the erroneous correspondence relation from continuing. Accordingly, the data from the functional unit can be relayed correctly. Therefore, the satisfactory communication can be provided in the in-vehicle network.

(12) A computer readable non-transitory recording medium according to an embodiment of the present disclosure is a computer readable non-transitory recording medium recording a communication control program used in an in-vehicle communication device that performs a relay process of relaying data between functional units in an in-vehicle network, the communication control program causing a computer to function as: a communication unit that performs the relay process using correspondence information indicating a correspondence relation between an IP address and a MAC address of one or more functional units; an address managing unit that generates the correspondence information; and an authenticating unit that performs an authentication process for the functional unit, in which the authenticating unit performs the authentication process for the functional unit in which an IP address and a MAC address are newly registered in the correspondence information by the address managing unit, and the address managing unit does not permit rewriting of the newly registered correspondence relation until a predetermined condition is satisfied after the authentication process for the newly registered functional unit is successfully performed.

When the authentication process for the newly registered functional unit is successfully performed, the functional unit is considered to be a legitimate functional unit. With the above configuration, since the newly registered correct correspondence relation can be protected until the predetermined condition is satisfied, the relay process using the correct correspondence relation can be continued until at least the predetermined condition is satisfied. Accordingly, the data from the functional unit can be relayed correctly. Therefore, the satisfactory communication can be provided in the in-vehicle network.

Hereinafter, exemplary embodiment of the present disclosure will be described with reference to the appended drawings. In the drawings, the same or corresponding parts are designated by the same reference numerals, and description thereof will not be repeated. Also, at least some of the embodiments described below may be arbitrarily combined.

FIRST EMBODIMENT

[Configuration and Basic Operation]

FIG. 1 is a diagram illustrating a configuration of an in-vehicle communication system according to a first embodiment of the present disclosure.

Referring to FIG. 1, an in-vehicle communication system 301 includes an in-vehicle communication device 101 and a plurality of functional units 111. The in-vehicle communication system 301 is installed in a vehicle 1.

The functional unit 111 is, for example, an automated driving electronic control unit (ECU), a sensor, a navigation device, a telematics communication unit (TCU), a human machine interface, a camera, or the like, and can communicate with the in-vehicle communication device 101.

The in-vehicle communication device 101 and the functional unit 111 are connected to each other, for example, by a cable for in-vehicle Ethernet (registered trademark) communication (hereinafter also referred to as an "Ethernet cable").

The in-vehicle communication device 101 and the functional unit 111 communicate with each other using the Ethernet cable. Information is exchanged between the in-vehicle communication device 101 and the functional unit 111 using, for example, an Ethernet frame conforming to IEEE 802.3.

Figure 2:
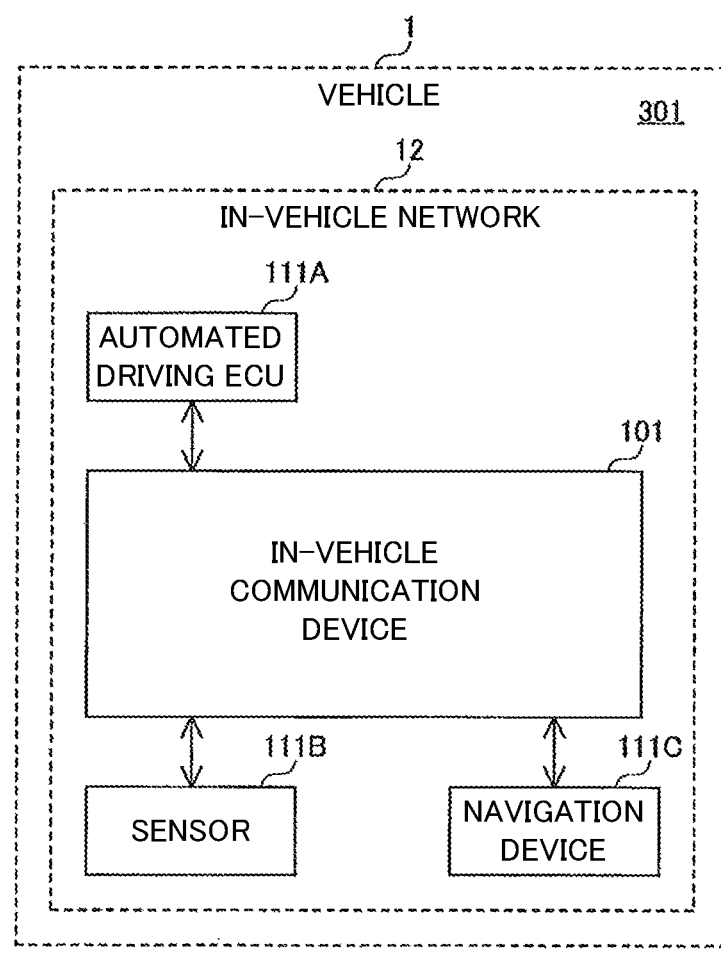
FIG. 2 is a diagram illustrating an application example of the in-vehicle communication system according to the first embodiment of the present disclosure.

FIG. 2 is a diagram illustrating an application example of the in-vehicle communication system according to the first embodiment of the present disclosure. In FIG. 2, as a specific example of the functional unit 111, an automated driving ECU 111A, a sensor 111B, and a navigation device 111C are illustrated.

The in-vehicle communication system 301 is not limited to the configuration including three functional units 111 and may be configured to include two or four or more functional units 111.

In an in-vehicle network 12, for example, the automated driving ECU 111A belongs to a subnet different from the sensor 111B and the navigation device 111C.

In the in-vehicle network 12, for example, information is transmitted and received using an IP packet in accordance with an IPv4 protocol. The IP packet is stored in an Ethernet frame and transmitted.

The in-vehicle communication device 101 is, for example, an in-vehicle gateway device, and performs a relay process of relaying data between the functional units 111 in the in-vehicle network 12.

Specifically, the in-vehicle communication device 101 relays the Ethernet frames transmitted among the automated driving ECU 111A, the sensor 111B, and the navigation device 111C.

In detail, the in-vehicle communication device 101 operates in accordance with a communication protocol having a plurality of layers. More specifically, the in-vehicle communication device 101 can function as a layer 2 (L2) switch, and relays an Ethernet frame transmitted between the functional units 111 belonging to the same subnet.

In this example, the in-vehicle communication device 101 relays an Ethernet frame transmitted between the automated driving ECU 111A and the sensor 111B.

Also, the in-vehicle communication device 101 can also function as an L3 relay device, and relays Ethernet frames between the functional units 111 belonging to different subnets.

In this example, the in-vehicle communication device 101 relays an Ethernet frame transmitted between the automated driving ECU 111A and the navigation device 111C and an Ethernet frame transmitted between the sensor 111B and the navigation device 111C.

More specifically, for example, the sensor 111B periodically senses an object in the vicinity of its own vehicle 1 of, generates an IP packet including sensor information indicating a sensing result, and stores the IP packet in the Ethernet frame.

The IP packet includes, for example, an IP address of the sensor 111B and an IP address of the automated driving ECU 111A as a transmission source IP address and a transmission destination IP address.

Since the sensor 111B belongs to the same subnet as the automated driving ECU 111A, the sensor 111B writes a MAC address of the automated driving ECU 111A and its own MAC address in the Ethernet frame as the transmission destination MAC address and the transmission source MAC address, respectively.

The sensor 111B transmits the Ethernet frame in which the transmission destination MAC address and the transmission source MAC address are written to the in-vehicle communication device 101.

Upon receiving the Ethernet frame from the sensor 111B, the in-vehicle communication device 101 performs a layer 2 switching process on the received Ethernet frame and transmits the Ethernet frame to the automated driving ECU 111A.

For example, the automated driving ECU 111A acquires the sensor information from the Ethernet frame received from the sensor 111B via the in-vehicle communication device 101, and controls an operation of its own vehicle 1 on the basis of the acquired sensor information.

Further, for example, the automated driving ECU 111A periodically transmits situation information indicating a situation of the automated driving of the vehicle 1 to the navigation device 111C.

More specifically, for example, the automated driving ECU 111A generates an IP packet including the situation information and stores the IP packet in the Ethernet frame.

The IP packet includes, for example, an IP address of the automated driving ECU 111A and an IP address of the navigation device 111C as the transmission source IP address and the transmission destination IP address.

Since the automated driving ECU 111A belongs to a subnet different from the navigation device 111C, the automated driving ECU 111A writes the MAC address of the in-vehicle communication device 101 which is a default gateway and its own MAC address in the Ethernet frame as the transmission destination MAC address and the transmission source MAC address.

The automated driving ECU 111A transmits the Ethernet frame in which the transmission destination MAC address and the transmission source MAC address are written to the in-vehicle communication device 101.

Upon receiving the Ethernet frame from the automated driving ECU 111A, the in-vehicle communication device 101 performs a layer 3 relay process on the received Ethernet frame and transmits the Ethernet frame to the navigation device 111C.

For example, the navigation device 111C acquires the situation information from the Ethernet frame received from the automated driving ECU 111A via the in-vehicle communication device 101, and displays the situation of the automated driving of the vehicle 1 indicated by the acquired situation information on a display device to notify a driver of the situation.

Figure 3:
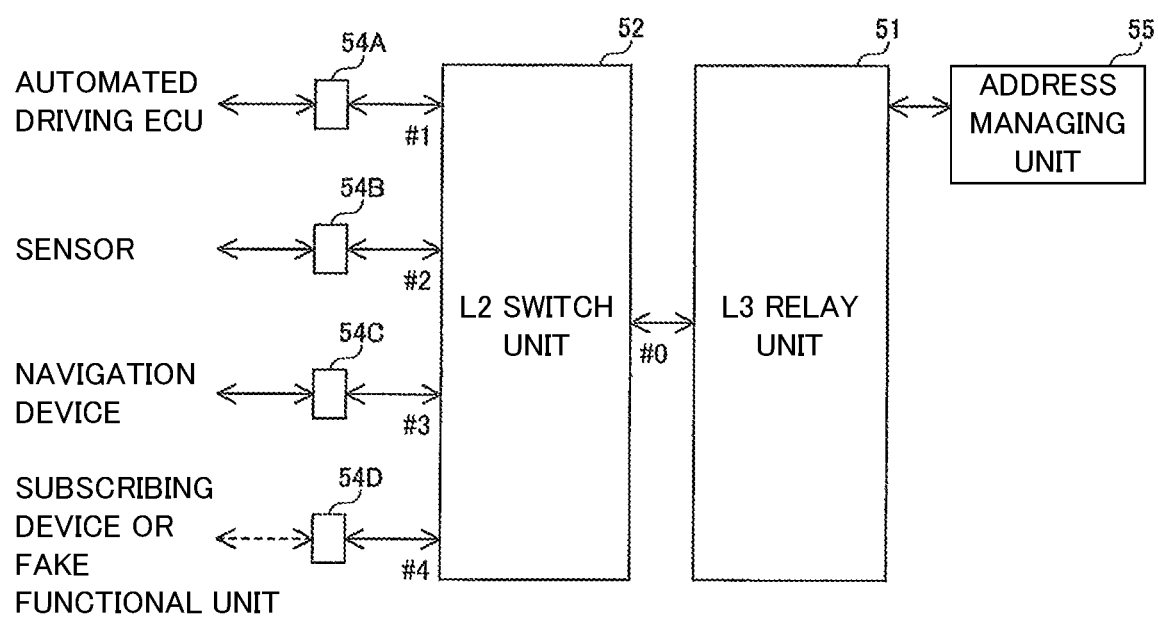
FIG. 3 is a diagram illustrating a configuration of an in-vehicle communication device in the in-vehicle communication system according to the first embodiment of the present disclosure.

FIG. 3 is a diagram illustrating a configuration of the in-vehicle communication device in the in-vehicle communication system according to the first embodiment of the present disclosure.

Referring to FIG. 3, the in-vehicle communication device 101 includes an L3 relay unit (communication unit) 51, an L2 switch unit 52, communication ports 54A, 54B, 54C, and 54D, and an address managing unit 55.

Hereinafter, each of the communication ports 54A, 54B, 54C, and 54D is also referred to as a communication port 54. The communication port 54 is, for example, a terminal to which an Ethernet cable can be connected.

The in-vehicle communication device 101 is not limited to the configuration in which the four communication ports 54 are disposed and may have a configuration in which two, three, or five or more communication ports 54 are disposed.

A plurality of communication ports 54 can be connected to a plurality of functional units in the vehicle 1, respectively. In this example, the communication ports 54A, 54B, and 54C are connected to the automated driving ECU 111A, the sensor 111B, and the navigation device 111C via the Ethernet cables, respectively. The communication port 54D is, for example, a port (hereinafter also referred to as an extension port) used when a user adds the functional unit 111 or the like, and is a free port in an initial state.

[Layer 2 Switching Process]

The L2 switch unit 52 and the L3 relay unit 51 perform the relay process of relaying data between the functional units 111 in the in-vehicle network 12.

More specifically, the L2 switch unit 52 is, for example, an L2 switch integrated circuit (IC), and performs a layer 2 switching process of relaying an Ethernet frame which is transmitted and received between the functional units 111 belonging to the same subnet.

FIG. 4 is a diagram illustrating an example of an ARL table held in the L2 switch unit in the in-vehicle communication device according to the first embodiment of the present disclosure.

Referring to FIGS. 3 and 4, for example, the L2 switch unit 52 includes a plurality of terminals connected to the communication ports 54A, 54B, 54C, and 54D and the L3 relay unit 51. Each port is assigned a unique logical port number.

In this example, logical port numbers of the terminals connected to the L3 relay unit 51, the communication port 54A, the communication port 54B, the communication port 54C, and the communication port 54D are #0, #1, #2, #3 and #4, respectively.

Hereinafter, the terminals which are assigned the logical port numbers #1, #2, and #3 are also referred to as normal terminals. The terminal which is assigned the logical port number #4 is also referred to as an extension terminal.

The L2 switch unit 52 holds, for example, an address resolution logic (ARL) table.

The ARL table indicates a correspondence relation between a transmission destination MAC address and an output destination. Here, the output destination is the logical port number.

Specifically, the ARL table includes a correspondence relation between the MAC address of the functional unit 111 and the terminal having the functional unit 111 as the connection destination, here, the logical port number of the normal terminal and a correspondence relation between the MAC address of its own in-vehicle communication device 101 and the logical port number of the L3 relay unit 51.

The correspondence relations in the ARL table are registered, for example, when the functional unit 111 is connected to the communication port 54 via the Ethernet cable, and linking-up is performed between the functional unit 111 and the L2 switch unit 52. For example, the correspondence relations in the ARL table may be decided in advance by the user when a connection relation in the in-vehicle network 12 is fixed.

Upon receiving the Ethernet frame from the functional unit 111 via the communication port 54, the L2 switch unit 52 refers to the transmission destination MAC address included in the received Ethernet frame.

The L2 switch unit 52 acquires the output destination corresponding to the referred transmission destination MAC address from the ARL table, and outputs the received Ethernet frame to the acquired output destination.

Specifically, for example, the L2 switch unit 52 acquires any one among #1 to #3 as the logical port number corresponding to the referred transmission destination MAC address referred for an Ethernet frame for the Ethernet frame transmitted within the same subnet such as the Ethernet frame transmitted from the sensor 111B to the automated driving ECU 111A.

Then, the L2 switch unit 52 transmits the Ethernet frame received from the functional unit 111 via the communication port 54 from the terminal of the acquired logical port number to the other functional units 111 via the other communication ports 54.

On the other hand, the L2 switch unit 52 acquires #0 as the logical port number corresponding to the referred transmission destination MAC address for the Ethernet frame transmitted between different subnets such as the Ethernet frame transmitted from the automated driving ECU 111A to the navigation device 111C.

Then, the L2 switch unit 52 outputs the Ethernet frame received from the functional unit 111 via the communication port 54 to the L3 relay unit 51.

Also, upon receiving the Ethernet frame from the L3 relay unit 51, the L2 switch unit 52 refers to the transmission destination MAC address included in the received Ethernet frame.

The L2 switch unit 52 acquires the output destination corresponding to the referred transmission destination MAC address from the ARL table, and transmits the Ethernet frame received from the L3 relay unit 51 from the terminal corresponding to the acquired output destination to the functional unit 111 via the communication port 54.

[Layer 3 Relay Process]

Referring back to FIG. 3, the L3 relay unit 51 performs the layer 3 relay process using the correspondence information indicating the correspondence relations between the IP addresses and the MAC addresses of a plurality of functional units 111.

More specifically, upon receiving the Ethernet frame from the L2 switch unit 52, the L3 relay unit 51 performs the L3 relay process of rewriting the transmission destination MAC address and the transmission source MAC address of the received Ethernet frame.

More specifically, for example, the L3 relay unit 51 holds a routing table indicating a correspondence relation between a transmission destination network and the transmission interface. Also, for example, the L3 relay unit 51 holds an address resolution protocol (ARP) table which is an example of the correspondence information for each transmission interface.

Figure 5:
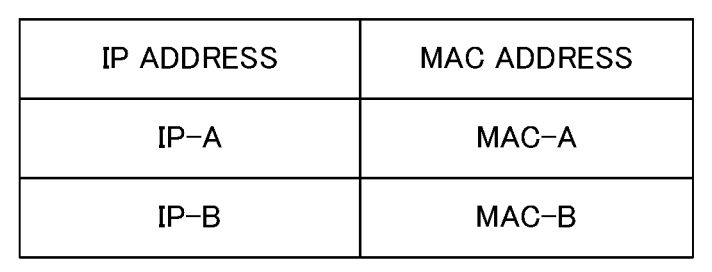

FIG. 5 is a diagram illustrating an example of an ARP table held in the L3 relay unit in the in-vehicle communication device according to the first embodiment of the present disclosure.

FIG. 5 illustrates, for example, an ARP table of a subnet to which the automated driving ECU 111A and the sensor 111B belong.

In the ARP table, "IP-A" and "MAC-A" are the IP address and the MAC address of the automated driving ECU 111A, respectively. "IP-B" and "MAC-B" are the IP address and the MAC address of the sensor 111B, respectively.

Upon receiving the Ethernet frame from the L2 switch unit 52, the L3 relay unit 51 acquires the transmission destination IP address from the IP packet included in the received Ethernet frame, performs a subnet mask calculation on the acquired transmission destination IP address, and specifies the transmission destination network.

The L3 relay unit 51 specifies the transmission interface corresponding to the specified transmission destination network with reference to the routing table.

Then, the L3 relay unit 51 acquires the MAC address corresponding to the transmission destination IP address from the ARP table with reference to the ARP table corresponding to the specified transmission interface.

The L3 relay unit 51 rewrites the transmission destination MAC address and the transmission source MAC address of the Ethernet frame onto the acquired MAC address and the MAC address of its own in-vehicle communication device 101, and outputs the rewritten Ethernet frame to the L2 switch unit 52.

[ARP Request Frame]

Figure 6:
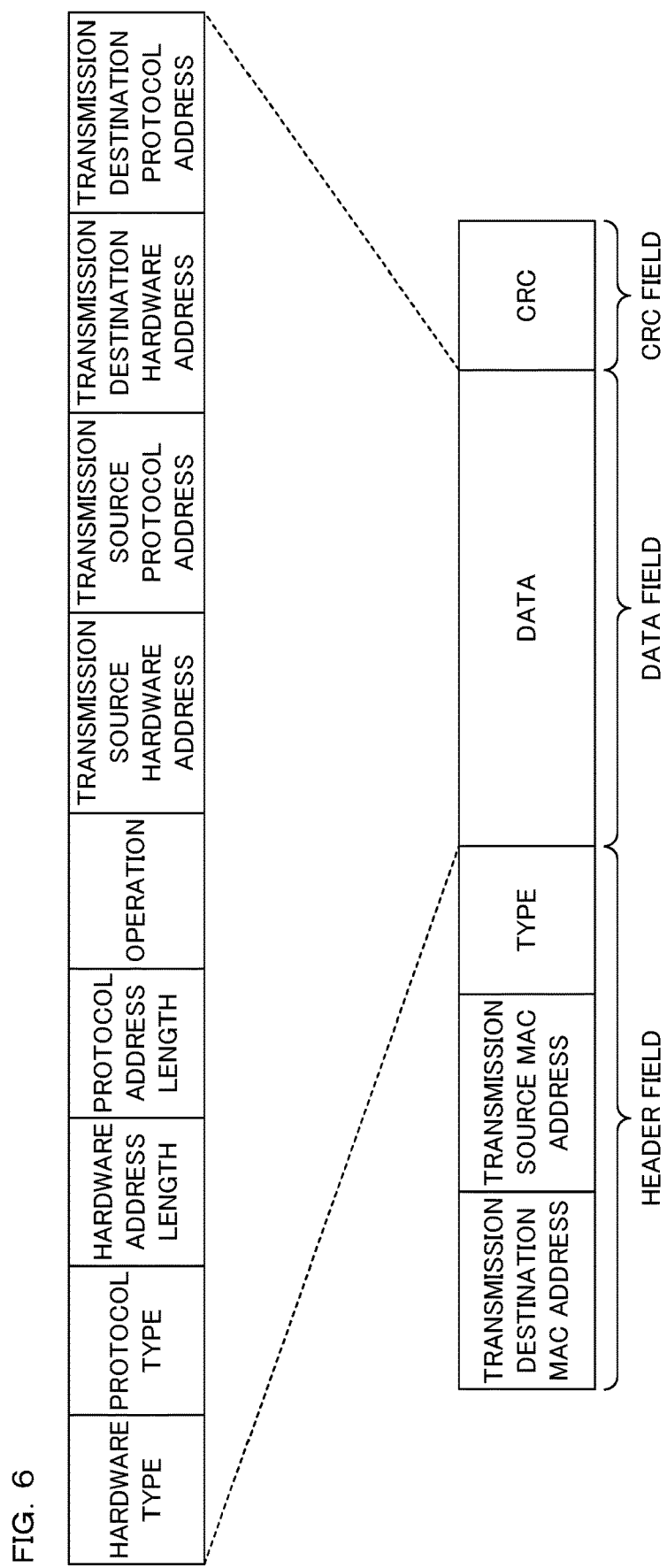
FIG. 6 is a diagram illustrating an example of an ARP request frame transmitted in the in-vehicle communication system according to the first embodiment of the present disclosure.

FIG. 6 is a diagram illustrating an example of an ARP request frame transmitted in the in-vehicle communication system according to the first embodiment of the present disclosure.

Referring to FIG. 6, the ARP request frame includes a header field, a data field, and a cyclic redundancy check (CRC) field.

A transmission destination MAC address, a transmission source MAC address, and a type are stored in the header field.

A hardware type, a protocol type, a hardware address length, a protocol address length, an operation, a transmission source hardware address, a transmission source protocol address, a transmission destination hardware address, and a transmission destination protocol address are stored in the data field. A CRC value is stored in the CRC field.

For example, a situation in which a new functional unit 111 (hereinafter also referred to as a subscribing device) is connected to the communication port 54D via an Ethernet cable is assumed with reference to FIGS. 3 and 6. Here, the IP address and the MAC address of the subscribing device are "IP-D" and "MAC-D," respectively. "IP-D" is included, for example, in an address range of the subnet to which the automated driving ECU 111A and the sensor 111B belong.

For example, the subscribing device performs address resolution to perform communication in accordance with the IP protocol. Specifically, for example, the subscribing device holds the IP address of the in-vehicle communication device 101 which is a default gateway but does not hold the MAC address corresponding to the IP address. The subscribing device broadcasts the ARP request frame illustrated in FIG. 6 for the purpose of acquiring the MAC address of the in-vehicle communication device 101.

In this case, the following values are set in the respective fields in the ARP request frame. That is, setting values of the transmission destination MAC address, the transmission source MAC address, and the type in the header field are "FF-FF-FF-FF-FF-FF," "MAC-D," and "0x0806," respectively. Here, a number beginning with "0x" means that the numbers after "0x" are represented in hexadecimal.

Setting values of the hardware type, the protocol type, the hardware address length, the protocol address length, and the operation in the data field are "0x0001," "0x0800," "0x06," "0x04," and "0x0001," respectively.

Also, setting values of the transmission source hardware address, the transmission source protocol address, the transmission destination hardware address, and the transmission destination protocol address in the data field are "MAC-D," "IP-D," "zero," and the IP address of the in-vehicle communication device 101, respectively.

Upon receiving the ARP request frame from the subscribing device via the communication port 54D, the L2 switch unit 52 in the in-vehicle communication device 101 outputs the received ARP request frame to the L3 relay unit 51.

Upon receiving the ARP request frame from the L2 switch unit 52, the L3 relay unit 51 outputs the received ARP request frame to the address managing unit 55.

FIG. 7 is a diagram illustrating an example of an ARP table held in the L3 relay unit in the in-vehicle communication device according to the first embodiment of the present disclosure.

Referring to FIG. 7, the address managing unit 55 generates the correspondence information. In detail, for example, the address managing unit 55 registers the correspondence information between the transmission source IP address and the transmission source MAC address included in the data field of the frame of the layer 2 received from the functional unit 111 via the L3 relay unit 51.

More specifically, upon receiving the ARP request frame from the L3 relay unit 51, the address managing unit 55 recognizes that the ARP request frame is addressed to itself since the transmission destination protocol address included in the received ARP request frame is the IP address of its own in-vehicle communication device 101.

The address managing unit 55 registers the transmission source protocol address included in the ARP request frame, that is, "IP-D" and the transmission source hardware address, that is, "MAC-D" in the ARP table as illustrated in FIG. 7. Accordingly, the ARP table is generated.

"IP-A" and "MAC-A" and "IP-B" and "MAC-B" in the ARP table are also addresses registered on the basis of the ARP request frame.

Referring back to FIG. 3, for example, the address managing unit 55 generates an ARP reply frame including the MAC address and the IP address of its own in-vehicle communication device 101 as the transmission source hardware address and the transmission source protocol address, and transmits the generated ARP reply frame to the subscribing device via L3 relay unit 51, the L2 switch unit 52, and the communication port 54D.

Upon receiving the ARP reply frame from the in-vehicle communication device 101, the subscribing device acquires the transmission source hardware address from the received ARP reply frame, and holds the acquired transmission source hardware address as the MAC address corresponding to the IP address of the in-vehicle communication device 101. Accordingly, a communication connection is established between the subscribing device and the in-vehicle communication device 101.

[Problems]

For example, a new functional unit (hereinafter also referred to as a fake functional unit) pretending to be a legitimate functional unit 111 may be connected to the in-vehicle communication device 101.

More specifically, for example, the fake functional unit is connected to the communication port 54D in the in-vehicle communication device 101 by a malicious user for the purpose of interrupting communication between the automated driving ECU 111A and the in-vehicle communication device 101 by pretending to be the automated driving ECU 111A. Here, the MAC address of the fake functional unit is assumed to be "MAC-Z."

The fake functional unit, for example, generates the following ARP request frame in order to pretend to be the automated driving ECU 111A (see FIG. 6).

That is, the setting values of the transmission destination MAC address and the transmission source MAC address in the header field in this ARP request frame are "FF-FF-FF-FF-FF-FF" and "MAC-Z," respectively.

Also, the transmission source hardware address and the transmission source protocol address in the data field are "MAC-X" and "IP-A." For example, "MAC-X" is a fictitious address for causing the ARP table in the in-vehicle communication device 101 to learn an incorrect MAC address.

The other setting values are similar to the setting values in the ARP request frame generated by the subscribing device. The fake functional unit broadcasts the generated ARP request frame.

Figure 8:
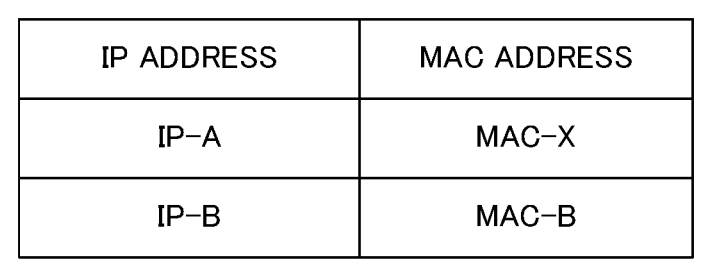

FIG. 8 is a diagram illustrating an example of an ARP table held in the L3 relay unit in the in-vehicle communication device according to the first embodiment of the present disclosure.

Referring to FIGS. 3 and 8, upon receiving the ARP request frame from the fake functional unit via the communication port 54D, the L2 switch unit 52, and the L3 relay unit 51, the address managing unit 55 in the in-vehicle communication device 101 recognizes that the ARP request frame is addressed to itself since the transmission destination protocol address included in the ARP request frame is the IP address of its own in-vehicle communication device 101.

For example, if the address managing unit 55 registers the transmission source protocol address included in the ARP request frame, that, "IP-A" and the transmission source hardware address, that is, "MAC-X" in the ARP table as illustrated in FIG. 8, the following problems occur.

That is, the address managing unit 55 erroneously learns the correspondence relation, and thus the valid ARP table illustrated in FIG. 5 is altered to the ARP table illustrated in FIG. 8.

Therefore, the automated driving ECU 111A erroneously registers "MAC-X" in the ARP table in the in-vehicle communication device 101 even though its own MAC address is "MAC-A," and thus communication is unable to be performed normally in the in-vehicle network 12.

As another example, for example, in a situation in which an inspection tool is connected to an extension port of the in-vehicle communication device 101 as the functional unit 111, the fake functional unit may interfere with communication of the inspection tool.

More specifically, for example, the inspection tool is connected to the extension port in the in-vehicle communication device 101 via a switch device. The fake functional unit is also connected to the switch device.

The present disclosure is not limited to the configuration in which the inspection tool and the fake functional unit are connected to the extension port in the in-vehicle communication device 101 via the switch device, for example, a configuration in which the inspection tool and the fake functional unit are connected to individual extension ports in a case in which a plurality of extension ports are disposed in the in-vehicle communication device 101 may be provided.

For example, the inspection tool communicates with the in-vehicle communication device 101 and the functional unit 111 in order to update and check firmware in the in-vehicle communication device 101 and the functional unit 111.

A correspondence relation between the IP address and the MAC address of the inspection tool is registered in the in-vehicle communication device 101.

For example, the fake functional unit generates the following ARP request frame in order to pretend to be the inspection tool (see FIG. 6).

That is, the setting values of the transmission destination MAC address and the transmission source MAC address in the header field in this ARP request frame are "FF-FF-FF-FF-FF-FF" and "MAC-Z," respectively.

Also, the transmission source hardware address and the transmission source protocol address in the data field are "MAC-X" and the IP address of the inspection tool.

The other setting values are similar to the setting values in the ARP request frame generated by the subscribing device. The fake functional unit broadcasts the generated ARP request frame.

In the in-vehicle communication device 101, the ARP table is altered by the ARP request frame. Therefore, updating and inspection of the firmware by the inspection tool are blocked.

In this regard, in the in-vehicle communication device according to an embodiment of the present disclosure, such problems are solved by the following configuration and operation.

Referring to FIG. 3, for example, the address managing unit 55 performs the following process when the transmission source MAC address included in the data field of the frame of the layer 2 received from the functional unit 111 via the L3 relay unit 51 coincides with the transmission source MAC address included in the header field of the frame.

That is, the address managing unit 55 does not register the correspondence relation between the IP address and the MAC address included in the data field in the correspondence information.

Specifically, the address managing unit 55 checks whether or not the transmission source MAC address in the header field of the ARP request frame received from the functional unit 111 coincides with the transmission source hardware address in the data field.

More specifically, for example, the address managing unit 55 checks that both addresses do not coincide with each other since the transmission source MAC address and the transmission source hardware address are "MAC-Z" and "MAC-X," respectively, for the ARP request frame received from the fake functional unit.

In this case, the address managing unit 55 does not register the transmission source protocol address included in the ARP request frame, that is, "IP-A" and the transmission source hardware address, that is, "MAC-X" in the ARP table. Also, the address managing unit 55 discards the ARP request frame. Accordingly, the ARP table illustrated in FIG. 5 can be maintained appropriately.

On the other hand, for example, the address managing unit 55 checks that both addresses coincide with each other since the transmission source MAC address and the transmission source hardware address are "MAC-D" and "MAC-D," respectively, for the ARP request frame received from the subscribing device.

In this case, the address managing unit 55 registers the transmission source protocol address included in the ARP request frame, that is, "IP-D" and the transmission source hardware address, that is, "MAC-D" in the ARP table. Accordingly, the ARP table illustrated in FIG. 5 is updated to the ARP table illustrated in FIG. 7, and the subscribing device can perform communication normally in the in-vehicle network 12.

Further, in the in-vehicle communication device according to the first embodiment of the present disclosure, the address managing unit 55 is configured not to register the correspondence relation between the IP address and the MAC address included in the data field from the fake functional unit in the correspondence information, but the present disclosure is not limited to this example. The address managing unit 55 may be configured to delete the correspondence relation from the correspondence information.

Specifically, for example, as illustrated in FIG. 8, the address managing unit 55 performs the following process upon receiving the ARP request frame from the fake functional unit in a situation in which a set of "IP-A" and "MAC-X" is registered in the ARP table.

That is, the address managing unit 55 checks that both addresses do not coincide with each other since the transmission source MAC address and the transmission source hardware address are "MAC-Z" and "MAC-X," respectively, for the ARP request frame received from the fake functional unit.

Further, the address managing unit 55 deletes a set of "IP-A" and "MAC-X" from the ARP table illustrated in FIG. 8 on the basis of the transmission source protocol address included in the ARP request frame, that is, "IP-A" and the transmission source hardware address, that is, "MAC-X."

[Flow of Operation]

Each of the devices in the in-vehicle communication system 301 includes a computer, and an operation processing unit such as a CPU in the computer reads a program including some or all of steps in the following sequence diagram or flowchart from a memory (not illustrated) and executes the program. Each of the programs of the plurality of devices can be installed from the outside. Each of the programs of the plurality of devices is distributed in a state in which it is stored in a recording medium.

Figure 9:
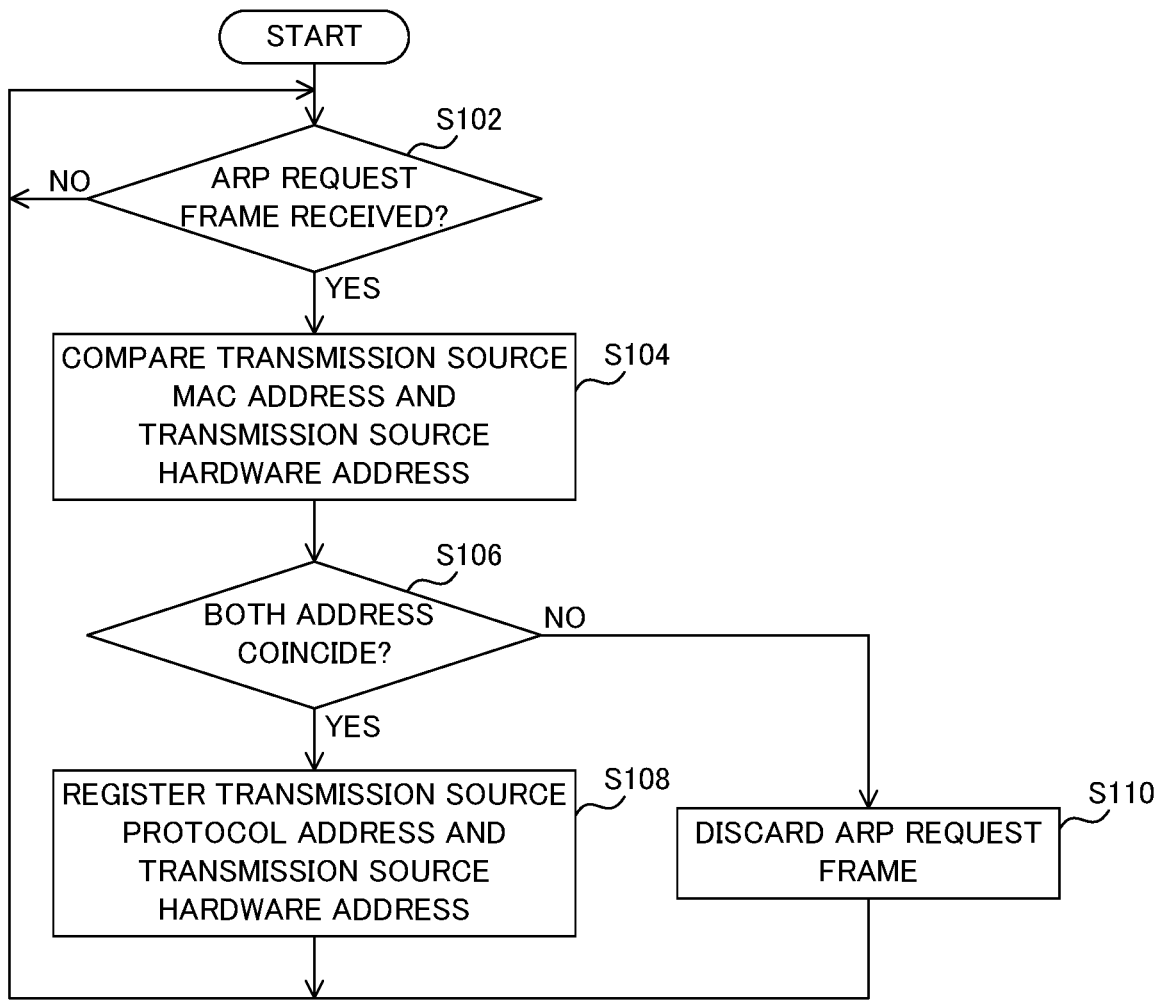
FIG. 9 is a flowchart illustrating an operation procedure when the in-vehicle communication device in the in-vehicle communication system according to the first embodiment of the present disclosure processes a received ARP request frame.

FIG. 9 is a flowchart illustrating an operation procedure when the in-vehicle communication device in the in-vehicle communication system according to the first embodiment of the present disclosure processes the received ARP request frame.

Referring to FIG. 9, first, the in-vehicle communication device 101 performs the relay process of relaying data between the functional units 111 until the ARP request frame is received (NO at step S102).

Then, upon receiving the ARP request frame (YES at step S102), the in-vehicle communication device 101 compares the transmission source MAC address in the header field of the received ARP request frame with the transmission source hardware address in the data field (step S104).

Next, when both addresses do not coincide with each other (NO at step S106), the in-vehicle communication device 101 does not register the transmission source protocol address and the transmission source hardware address in the data field of the received ARP request frame in the ARP table, discards the ARP request frame, and ends the processing of the received ARP request frame (S110).

On the other hand, when both addresses coincide with each other (YES at step S106), the in-vehicle communication device 101 registers the transmission source protocol address and the transmission source hardware address in the data field of the received ARP request frame in the ARP table (step S108).

Then, the in-vehicle communication device 101 performs the relay process until a new ARP request frame is received (NO at step S102).

Further, at step S110, for example, when a set of the transmission source protocol address and the transmission source hardware address in the data field of the received ARP request frame is registered in the ARP table, the in-vehicle communication device 101 may perform deletion of the set from the ARP table in addition to the discarding of the ARP request frame.

[Modified Example of In-Vehicle Communication System 301]

In the in-vehicle communication system 301, communication is performed in accordance with the IPv4 protocol, but the present disclosure is not limited to this example. In the in-vehicle communication system 301, communication may be performed in accordance with an IPv6 protocol.

[ND Frame]

Figure 10:
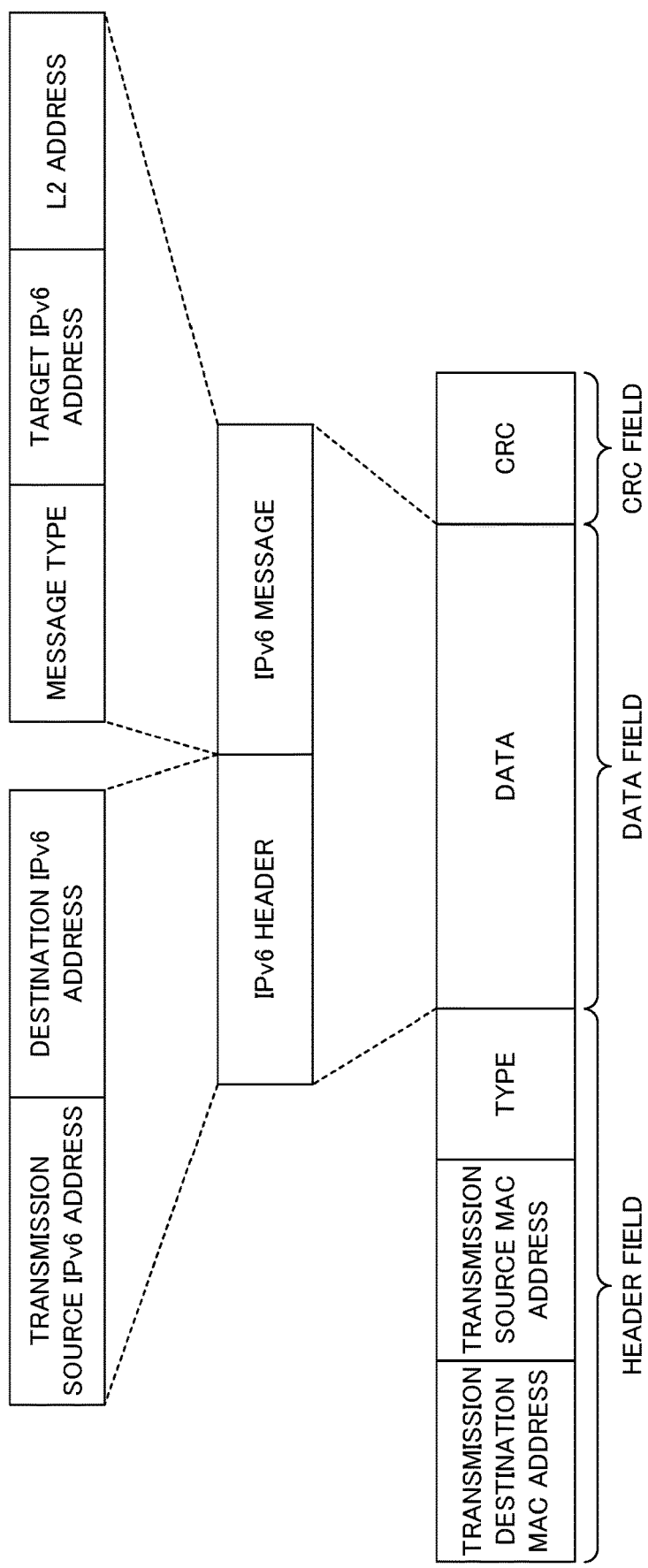
FIG. 10 is a diagram illustrating an example of an ND frame transmitted in a modified example of the in-vehicle communication system according to the first embodiment of the present disclosure.

FIG. 10 is a diagram illustrating an example of an ND frame transmitted in a modified example of the in-vehicle communication system according to the first embodiment of the present disclosure.

Referring to FIG. 10, a neighbor discovery (ND) frame includes a header field, a data field, and a CRC field.

A transmission destination MAC address, a transmission source MAC address, and a type are stored in the header field.

An IPv6 header and an IPv6 message are stored in the data field. A transmission source IPv6 address and a destination IPv6 address are stored in the IPv6 header. A message type, a target IPv6 address, and an L2 address are stored in the IPv6 message. A CRC value is stored in the CRC field.

An ND frame in which a setting value of the message type is 135 is a neighbor solicitation (NS) frame corresponding to an ARP request frame in IPv4.

Further, an ND frame in which a setting value of the message type 136 is a neighbor advertisement (NA) frame corresponding to an ARP reply frame in IPv4.

[ND Cache in IPv6]

Referring to FIGS. 3 and 10, for example, the subscribing device generates the following NS frame in a situation in which it is newly connected to the communication port 54D via the Ethernet cable, and multicasts the generated NS frame.

That is, a setting value of the transmission destination MAC address in the header field is a MAC address of IPv6 multicast based on a request node multicast address of the in-vehicle communication device 101. Also, a setting value of the transmission source MAC address in the header field is "MAC-D."

Setting values of the transmission source IPv6 address and the destination IPv6 address in the IPv6 header of the data field are "IPv6-D" which is a global unicast address of the subscribing device and the request node multicast address of the in-vehicle communication device 101, respectively.

Setting values of the message type, the target IPv6 address, and the L2 address in the IPv6 message of the data field are "135," the global unicast address of the in-vehicle communication device 101, and "MAC-D," respectively.

FIG. 11 is a diagram illustrating an example of the ND cache held in the L3 relay unit of the in-vehicle communication device in the modified example of the in-vehicle communication system according to the first embodiment of the present disclosure.

Referring to FIG. 11, for example, the L3 relay unit 51 holds the routing table indicating the correspondence relation between the transmission destination network and the transmission interface. For example, the L3 relay unit 51 holds the ND cache which is an example of the correspondence information for each transmission interface.

Upon receiving the NS frame from the subscribing device via the communication port 54D, the L2 switch unit 52, and the L3 relay unit 51, the address managing unit 55 recognizes that the NS frame is addressed to itself since the target IPv6 address included in the received NS frame is its own global unicast address.

Then, the address managing unit 55 checks whether or not the transmission source MAC address in the header field of the received NS frame coincides with the L2 address in the data field.

In this case, for example, the address managing unit 55 checks that both addresses coincide with each other since the transmission source MAC address and the L2 address are "MAC-D" and "MAC-D" respectively.

The address managing unit 55 registers the transmission source IPv6 address, that is, "IPv6-D" and the L2 address, that is, "MAC-D," included in the NS frame in the ND cache as illustrated in FIG. 11. Accordingly, the ND cache is generated.

"IPv6-A" and "MAC-A" and "IPv6-B" and "MAC-B" in the ND cache are also addresses registered on the basis of the NS frame. Here, "IPv6-A" and "IPv6-B" are IPv6 addresses of the automated driving ECU 111A and the sensor 111B, respectively.

Referring back to FIG. 3, for example, the address managing unit 55 generates the NA frame including "136," the global unicast address of its own in-vehicle communication device 101, and the MAC address of its own in-vehicle communication device 101 as the message type, the target IPv6 address, and the L2 address, respectively, and transmits the generated NA frame to the subscribing device via the L3 relay unit 51, the L2 switch unit 52, and the communication port 54D.

Upon receiving the NA frame from the in-vehicle communication device 101, the subscribing device acquires the L2 address from the received NA frame, and holds the acquired L2 address as the MAC address corresponding to the IPv6 address of the in-vehicle communication device 101. Accordingly, the communication connection is established between the subscribing device and the in-vehicle communication device 101.

[Fake NS Frame in IPv6]

For example, the fake functional unit generates the following NS frame and multicasts the generated NS frame in order to pretend to be the automated driving ECU 111A.

That is, a setting value of the transmission destination MAC address in the header field in this NS frame is the MAC address of the IPv6 multicast based on the request node multicast address of the in-vehicle communication device 101. Also, the setting value of the transmission source MAC address in the header field is "MAC-Z" (see FIG. 10).

Also, the transmission source IPv6 address and the L2 address in the data field are "IPv6-A" and "MAC-X," respectively. The other setting values are similar to the setting values in the NS frame generated by the subscribing device.

Upon receiving the NS frame from the fake functional unit via the communication port 54D, the L2 switch unit 52, and the L3 relay unit 51, the address managing unit 55 in the in-vehicle communication device 101 recognizes that the NS frame is addressed to itself since the target IPv6 address included in the received NS frame is its own global unicast address.

Then, the address managing unit 55 checks whether or not the transmission source MAC address in the header field of the received NS frame coincides with the L2 address in the data field.

In this case, the address managing unit 55 checks that both addresses do not coincide with each other since the transmission source MAC address and the L2 address are "MAC-Z" and "MAC-X," respectively.

The address managing unit 55 does not register the transmission source IPv6 address included in the NS frame, that is, "IPv6-A" and the L2 address, that is, "MAC-X" in the ND cache. Further, the address managing unit 55 discards the NS frame. Accordingly, the ND cache can be maintained appropriately.

[Flow of Operation]

Figure 12:
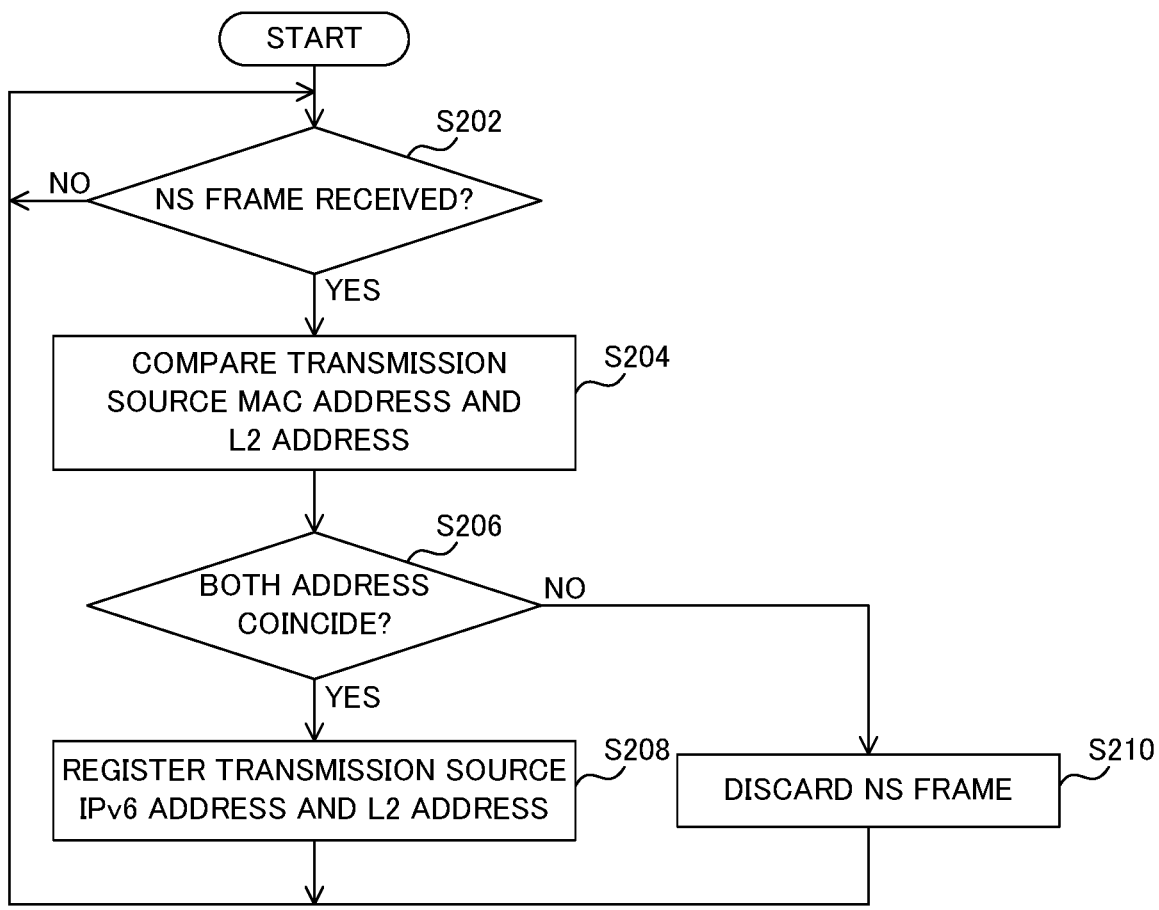
FIG. 12 is a flowchart illustrating an operation procedure when the in-vehicle communication device in the modified example of the in-vehicle communication system according to the first embodiment of the present disclosure processes a received NS frame.

FIG. 12 is a flowchart illustrating an operation procedure when the in-vehicle communication device in the modified example of the in-vehicle communication system according to the first embodiment of the present disclosure processes the received NS frame.

Referring to FIG. 12, first, the in-vehicle communication device 101 performs the relay process of relaying data between the functional units 111 until the NS frame is received (NO at step S202).

Then, upon receiving the NS frame (YES at step S202), the in-vehicle communication device 101 compares the transmission source MAC address in the header field of the received NS frame with the L2 address in the data field (step S204).

Next, when both addresses do not coincide with each other (NO at step S206), the in-vehicle communication device 101 does not register the transmission source IPv6 address and the L2 address in the data field of the received NS frame in the ND cache, discards the NS frame, and ends the processing of the received NS frame (step S210).

On the other hand, when both addresses coincide with each other (YES at step S206), the in-vehicle communication device 101 registers the transmission source IPv6 address and the L2 address in the data field of the received NS frame in the ND cache (step S208).

Then, the in-vehicle communication device 101 performs the relay process until a new NS frame is received (NO at step S202).

Further, at step S210, for example, when a set of the transmission source IPv6 address and the L2 address in the data field of the received NS frame is registered in the ND cache, the in-vehicle communication device 101 may perform deletion of the set from the ND cache in addition to the discarding of the ND frame.

Also, in the in-vehicle communication device according to the first embodiment of the present disclosure, a case in which a plurality of pairs of IP address and MAC address are registered in the ARP table and the ND cache has been described as an example, but the present disclosure is not limited to this example. There may be cases in which one pair is registered in the ARP table and the ND cache depending on the connection relation in the in-vehicle network.

Meanwhile, in the in-vehicle network disclosed in Japanese Patent Laid-Open Publication No. 2013-168865, the communication gateway that relays data from the in-vehicle control device is disposed.

For example, when the communication gateway performs the layer 3 relay process, the correspondence information indicating the correspondence relation between the IP address and the MAC address of the in-vehicle control device is used. If the correspondence information is altered without authorization, data from the in-vehicle control device will not be relayed properly, and thus communication is not normally performed in the in-vehicle network.

On the other hand, the in-vehicle communication device according to the first embodiment of the present disclosure performs the relay process of relaying data between the functional units 111 in the in-vehicle network. The L3 relay unit 51 performs the relay process using the correspondence information indicating the correspondence relation between the IP address and the MAC address of one or more of the functional units 111. The address managing unit 55 generates the correspondence information. The address managing unit 55 registers the correspondence relation between the transmission source IP address and the transmission source MAC address included in the data field of the frame of the layer 2 received from the functional unit 111 via the L3 relay unit 51 in the correspondence information. Then, when the transmission source MAC address and the transmission source MAC address included in the header of the frame do not coincide with each other, the address managing unit 55 does not register the correspondence relation in the correspondence information or deletes the correspondence relation from the correspondence information.

When the transmission source MAC address included in the data field does not coincide with the transmission source MAC address included in the header, the frame is likely to be an unauthorized frame. With the above configuration, it is possible to prevent the erroneous correspondence relation between the transmission source IP address and the transmission source MAC address included in the data field of the unauthorized frame from continuing to be registered in the correspondence information, and thus it is possible to prevent the relay process using the erroneous correspondence relation from continuing. Accordingly, the data from the functional unit 111 can be relayed correctly. Therefore, the satisfactory communication can be provided in the in-vehicle network.

Next, another embodiment of the present disclosure will be described with reference to the appended drawings. In the drawings, the same or corresponding parts are designated by the same reference numerals, and description thereof will not be repeated.

SECOND EMBODIMENT

The present embodiment relates to an in-vehicle communication device that authenticates the functional unit as compared with the in-vehicle communication device according to the first embodiment. Contents other than the content described below are similar to the in-vehicle communication device according to the first embodiment.

In an in-vehicle communication system according to a second embodiment of the present disclosure, communication is performed in accordance with the IPv4 protocol.

[Problems]

In the in-vehicle network 12 conforming to the IPv4 protocol, there are cases in which the fake functional unit generates the ARP request frame in which the transmission source MAC address in the header field and the transmission source hardware address in the data field are set to the same address (see FIG. 6).

For such an ARP request frame, it is difficult to detect an ARP request frame for causing the ARP table to perform erroneous learning on the basis of whether or not the transmission source MAC address and the transmission source hardware address coincide with each other.

Figure 13:
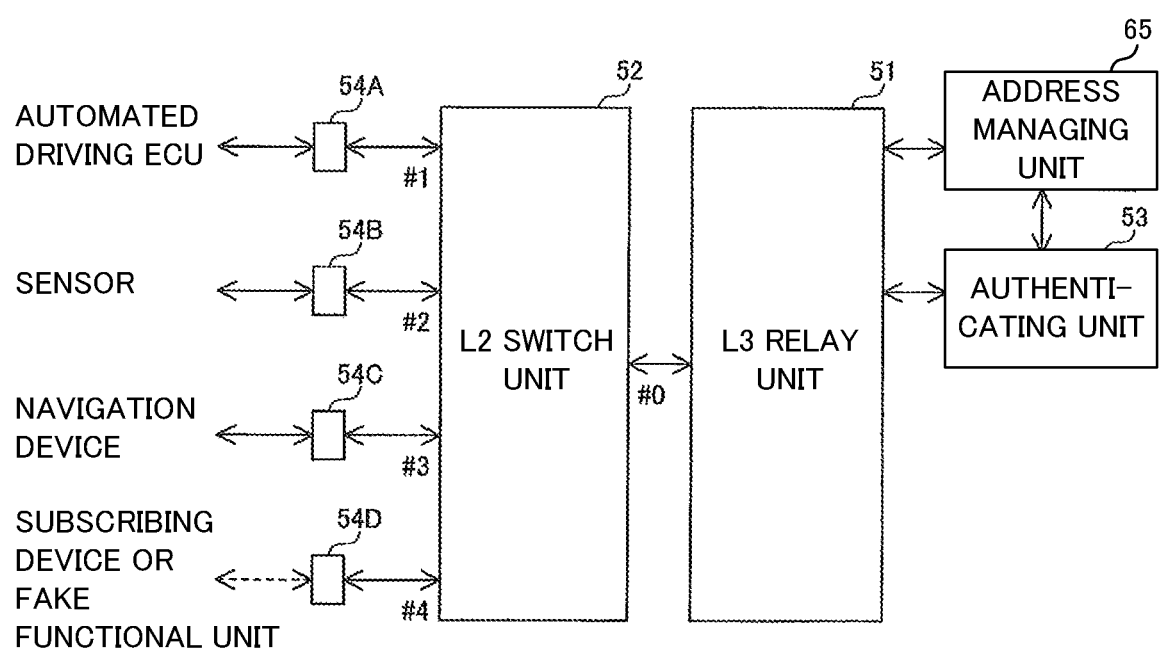
FIG. 13 is a diagram illustrating a configuration of an in-vehicle communication device in an in-vehicle communication system according to a second embodiment of the present disclosure.

FIG. 13 is a diagram illustrating a configuration of the in-vehicle communication device in the in-vehicle communication system according to the second embodiment of the present disclosure.

Referring to FIG. 13, an in-vehicle communication device 102 includes an L3 relay unit (communication unit) 51, an L2 switch unit 52, an authenticating unit 53, communication ports 54A, 54B, 54C, and 54D, and an address managing unit 65.

Operations of the L3 relay unit 51, the L2 switch unit 52, and the communication port 54 in the in-vehicle communication device 102 are similar to those of the L3 relay unit 51, the L2 switch unit 52, and the communication port 54 in the in-vehicle communication device 101 illustrated in FIG. 3, respectively.

The in-vehicle communication device 102 is not limited to the configuration in which the four communication ports 54 are disposed and may have a configuration in which two, three, or five or more communication ports 54 are disposed.

[ARP Request Frame from Subscribing Device]

For example, a situation in which the subscribing device is newly connected to communication port 54D via the Ethernet cable is assumed. Here, the IP address and the MAC address of the subscribing device are "IP-D" and "MAC-D," respectively.

The subscribing device broadcasts the ARP request frame illustrated in FIG. 6 for the purpose of acquiring the MAC address of the in-vehicle communication device 102.

In this case, the following values are set in respective fields in the ARP request frame. That is, the setting values of the transmission destination MAC address, the transmission source MAC address, and the type in the header field are "FF-FF-FF-FF-FF-FF," "MAC-D," and "0x0806," respectively.

The setting values of the transmission source hardware address, the transmission source protocol address, the transmission destination hardware address, and the transmission destination protocol address in the data field are "MAC-D," "IP-D," "zero," and the IP address of the in-vehicle communication device 102, respectively.

Upon receiving the ARP request frame from the subscribing device via the communication port 54D, the L2 switch unit 52, and the L3 relay unit 51, the address managing unit 65 in the in-vehicle communication device 102 recognizes that the ARP request frame is addressed to itself since the transmission destination protocol address included in the received ARP request frame is the IP address of its own the in-vehicle communication device 102.

The address managing unit 65 registers the transmission source protocol address included in the ARP request frame, that is, "IP-D" and the transmission source hardware address, that is, "MAC-D" in the ARP table (see FIG. 7).

The address managing unit 65 generates the ARP reply frame including the MAC address and the IP address of its own in-vehicle communication device 102 as the transmission source hardware address and the transmission source protocol address, respectively, and transmits the generated ARP reply frame to the subscribing device via the L3 relay unit 51, the L2 switch unit 52, and the communication port 54D.

Also, the address managing unit 65 outputs registration address information indicating a set of IP address and MAC address newly registered in the ARP table, that is, a set of "IP-D" and "MAC-D" to the authenticating unit 53.

The authenticating unit 53 performs an authentication process for the functional unit 111. Specifically, the authenticating unit 53 performs an authentication process for the functional unit 111 in which an IP address and a MAC address are newly registered in the correspondence information by the address managing unit 65.

More specifically, upon receiving the registration address information from the address managing unit 65, the authenticating unit 53 generates the authentication IP packet using "IP-D" and "MAC-D" indicated by the received registration address information as the destination.

The authenticating unit 53 attempts to authenticate the subscribing device by exchanging the authentication IP packet with the subscribing device via the L3 relay unit 51, the L2 switch unit 52, and the communication port 54D.

Here, the authenticating unit 53 successfully authenticates the subscribing device, and gives a permission for the L3 relay process for the IP packet from the subscribing device and the IP packet addressed to the subscribing device to the L3 relay unit 51. Accordingly, transmission and reception of the IP packet are performed between the subscribing device and the in-vehicle communication device 102 while maintaining security. Also, the authenticating unit 53 notifies the address managing unit 65 of the authentication result.

For example, after the authentication process for the newly registered functional unit 111 is successfully performed, the address managing unit 65 does not permit rewriting of a newly registered correspondence relation until a predetermined condition C1 is satisfied. Here, for example, the predetermined condition C1 is that communication of the newly registered functional unit 111 is interrupted for a predetermined period T1 or more.

More specifically, upon receiving a notification indicating that the authentication has been successfully performed from the authenticating unit 53, for example, the address managing unit 65 sets a non-revision period of the set from a timing at which a set of "IP-D" and "MAC-D" indicated by the registration address information to a timing at which a predetermined period T1 elapses.

Also, the address managing unit 65 monitors the use of the set of "IP-D" and "MAC-D" in the ARP table by the L3 relay unit 51.

If the L3 relay unit 51 uses the set of "IP-D" and "MAC-D," the address managing unit 65 uses an end timing of the non-revision period from the timing at which the L3 relay unit 51 uses it to a timing after the predetermined period T1.

The address managing unit 65 does not permit the rewriting of the set of "IP-D" and "MAC-D" until the non-revision period ends, and permits the rewriting of the set of "IP-D" and "MAC-D" when the non-revision period ends.

[ARP Request Frame from Fake Functional Unit]

For example, the fake functional unit is connected to the communication port 54D in the in-vehicle communication device 102 by the malicious user for the purpose of interrupting the communication between the automated driving ECU 111A and the in-vehicle communication device 102 by pretending to be the automated driving ECU 111A. Here, the MAC address of the fake functional unit is "MAC-X."

The fake functional unit, for example, generates the following ARP request frame in order to pretend to be the automated driving ECU 111A (see FIG. 6).

That is, the setting values of the transmission destination MAC address and the transmission source MAC address in the header field in this ARP request frame are "FF-FF-FF-FF-FF-FF" and "MAC-X," respectively.

Also, the setting values of the transmission source hardware address and the transmission source protocol address in the data field are "MAC-X" and "IP-A," respectively.

The other setting values are similar to the setting values in the ARP request frame generated by the subscribing device. The fake functional unit broadcasts the generated ARP request frame.

Upon receiving the ARP request frame from the fake functional unit via the communication port 54D, the L2 switch unit 52, and the L3 relay unit 51, the address managing unit 65 in the in-vehicle communication device 102 recognizes that the ARP request frame is addressed to itself since the transmission destination protocol address included in the received ARP request frame is the IP address of its own in-vehicle communication device 102.

The address managing unit 65 registers the transmission source protocol address, that is, "IP-A" and the transmission source hardware address, that is, "MAC-X" in the ARP table on the basis of the received ARP request frame (see FIG. 8).

Also, the address managing unit 65 outputs the registration address information indicating the set of IP address and MAC address newly registered in the ARP table, that is, the set "IP-A" and "MAC-X" to the authenticating unit 53.

Upon receiving the registration address information from the address managing unit 65, the authenticating unit 53 generates an authentication IP packet using "IP-A" and "MAC-X" indicated by the received registration address information as the destination.

The authenticating unit 53 transmits the authentication IP packet to the fake functional unit via the L3 relay unit 51, the L2 switch unit 52, and the communication port 54D, and attempts to authenticate the subscribing device by exchanging the authentication IP packet with the fake functional unit.

Here, since the fake functional unit is not a legitimate functional unit 111, the authenticating unit 53 fails in the authentication of the fake functional unit, and gives a notification indicating that the authentication has failed to the address managing unit 65.

The address managing unit 65 deletes the correspondence relation of the functional units 111 from the correspondence information when the newly registered functional unit 111 does not succeed in the authentication process.

More specifically, upon receiving the notification indicating that the authentication has failed from the authenticating unit 53, the address managing unit 65 deletes the set of "IP-A" and "MAC-X" from the ARP table illustrated in FIG. 8.

For example, after the set is deleted from the ARP table, when the Ethernet frame to be transmitted from the navigation device 111C to the automated driving ECU 111A is received from the L2 switch unit 52, the L3 relay unit 51 requests the address managing unit 65 to perform the address resolution of "IP-A" since the IP address of the automated driving ECU 111A, that is, "IP-A" is not included in the ARP table.

The address managing unit 65 broadcasts the ARP request frame via the L3 relay unit 51, the L2 switch unit 52, and the communication port 54 in response to an address resolution request from the L3 relay unit 51.

Further, the address managing unit 65 registers "IP-A" and "MAC-A" in the ARP table on the basis of the ARP reply frame which is the response to the ARP request frame received from the automated driving ECU 111A via the communication port 54A, the L2 switch unit 52, and the L3 relay unit 51 (see FIG. 5). Accordingly, the erroneously learned ARP table is reproduced as the correct ARP table.

[Flow of Operation]

Figure 14:
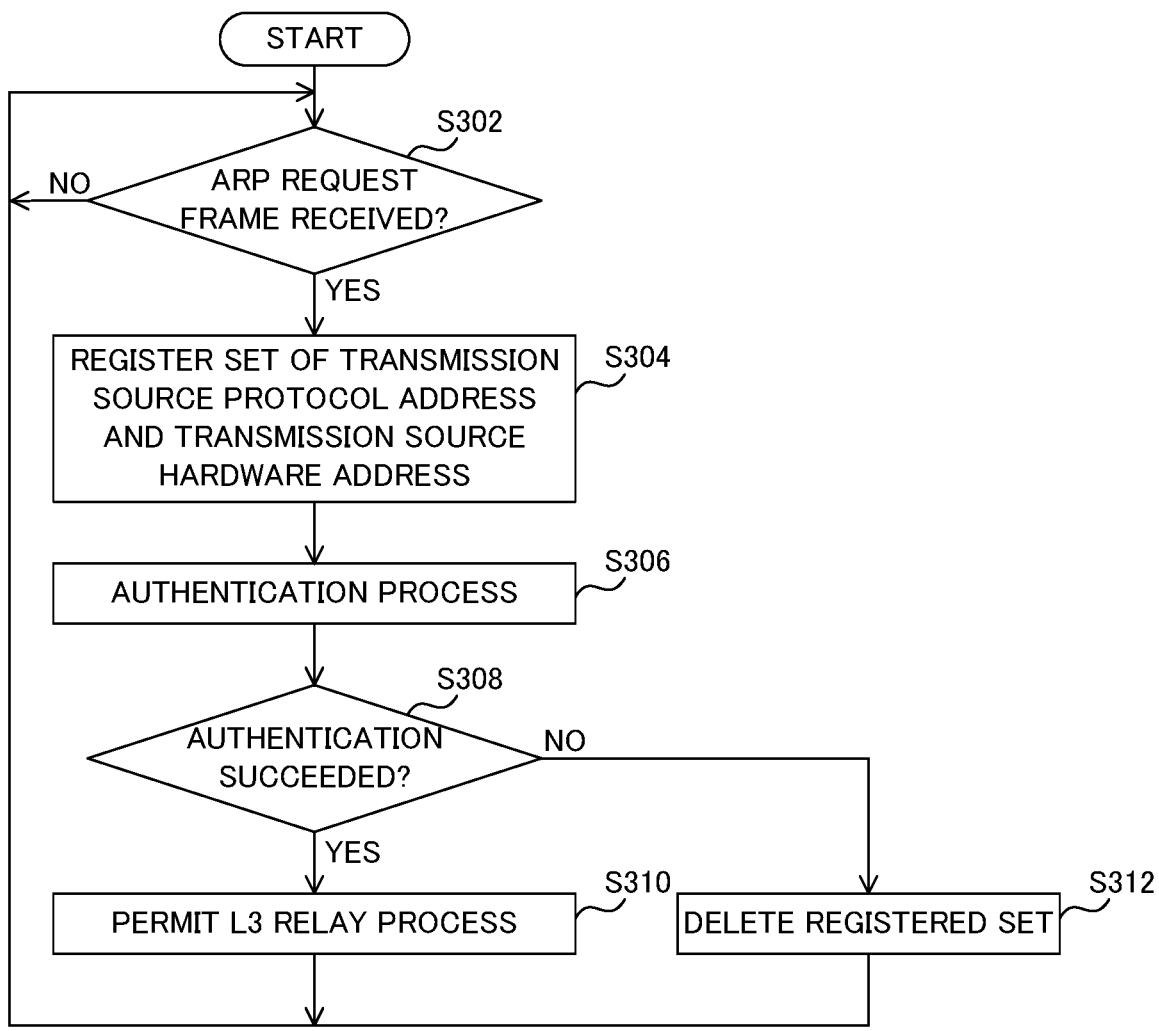
FIG. 14 is a flowchart illustrating an operation procedure when the in-vehicle communication device in the in-vehicle communication system according to the second embodiment of the present disclosure processes a received ARP request frame.

FIG. 14 is a flowchart illustrating an operation procedure when the in-vehicle communication device in the in-vehicle communication system according to the second embodiment of the present disclosure processes the received ARP request frame.

Referring to FIG. 14, first, the in-vehicle communication device 102 performs the relay process of relaying data between the functional units 111 until the ARP request frame is received (NO at step S302).

Then, upon receiving the ARP request frame (YES at step S302), the in-vehicle communication device 102 registers the set of transmission source protocol address and transmission source hardware address in the data field of the received ARP request frame in the ARP table (step S304).

Then, the in-vehicle communication device 102 attempts to authenticate the device by exchanging the authentication IP packet with the device that has transmitted the ARP request frame using the registered set (step S306).

Then, if the authentication of the device that has transmitted the ARP request frame fails (NO at step S308), the in-vehicle communication device 102 deletes the registered set from the ARP table, and does not permit the L3 relay process for the IP packet from the device and the IP packet addressed to the device (step S312).

On the other hand, when the authentication of the device that has transmitted the ARP request frame is successfully performed (YES at step S308), the in-vehicle communication device 102 permits the L3 relay process for the IP packet from the device and the IP packet addressed to the device (step S310).

Then, the in-vehicle communication device 102 performs the relay process until a new ARP request frame is received (NO at step S302).

Figure 15:
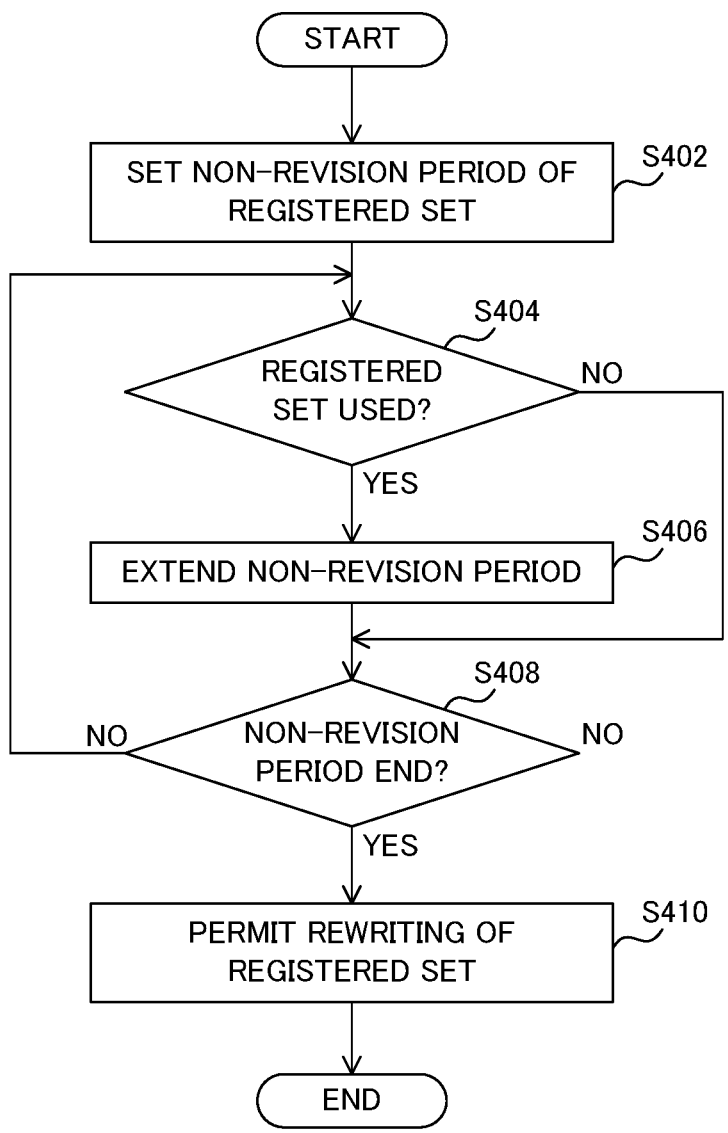
FIG. 15 is a flowchart illustrating an operation procedure when the in-vehicle communication device in the in-vehicle communication system according to the second embodiment of the present disclosure sets a non-revision period.

FIG. 15 is a flowchart illustrating an operation procedure when the in-vehicle communication device in the in-vehicle communication system according to the second embodiment of the present disclosure sets the non-revision period.

Referring to FIG. 15, when the authentication of the device that has transmitted the ARP request frame is successfully performed, and the L3 relay process for the IP packet from the device and the IP packet addressed to the device is permitted, the in-vehicle communication device 102 sets the non-revision period of the set from the timing at which the set is registered to the timing at which the predetermined period T1 elapses (step S402).

Then, if the registered set is used (YES at step S404) until the set non-revision period ends (NO at step S408), the in-vehicle communication device 102 extends the end timing from the timing at which it is used to the timing after the predetermined period T1 elapses (step S406).

On the other hand, when the set non-revision period ends (YES at step S408), the in-vehicle communication device 102 permits the rewriting of the registered set (step S410).

[Modified Example of In-Vehicle Communication System 301]

In the in-vehicle communication system according to the second embodiment of the present disclosure, the configuration in which communication is performed in accordance with the IPv4 protocol has been described, but the present disclosure is not limited to this example. The in-vehicle communication system according to the second embodiment of the present disclosure may be configured to perform communication in accordance with the IPv6 protocol.

[Problems]

In the in-vehicle network 12 conforming to the IPv6 protocol, there are cases in which the fake functional unit generates an NS frame in which the transmission source MAC address in the header field and the L2 address in the data field are set to the same address (see FIG. 10).

For such an NS frame, it is difficult to detect an NS frame for causing the ND cache to perform erroneous learning on the basis of whether or not the transmission source MAC address and the L2 address coincide with each other.

[NS Frame from Subscribing Device]

For example, a situation in which the subscribing device is newly connected to communication port 54D via the Ethernet cable is assumed. Here, the IP address and the MAC address of the subscribing device are "IPv6-D" and "MAC-D," respectively.

The subscribing device multicasts the NS frame illustrated in FIG. 10 for the purpose of acquiring the MAC address of the in-vehicle communication device 102.

In this case, the following values are set in respective field in the NS frame. That is, the setting value of the transmission destination MAC address in the header field is a MAC address of IPv6 multicast based on a request node multicast address of the in-vehicle communication device 102. Also, the setting value of the transmission source MAC address in the header field is "MAC-D."

The setting values of the transmission source IPv6 address and the destination IPv6 address in the IPv6 header of the data field are "IPv6-D" which is the global unicast address of the subscribing device and the request node multicast address of the in-vehicle communication device 102, respectively.

The setting values of the message type, the target IPv6 address, and the L2 address in IPv6 message of the data field are "135," the global unicast address of the in-vehicle communication device 102, and "MAC-D," respectively.

Upon receiving the NS frame from the subscribing device via the communication port 54D, the L2 switch unit 52, and the L3 relay unit 51, the address managing unit 65 in the in-vehicle communication device 102 recognizes that the NS frame is addressed to itself since the target IPv6 address included in the received NS frame is its own global unicast address.

The address managing unit 65 registers the transmission source IPv6 address included in the NS frame, that is, "IPv6-D" and the L2 address, that is, "MAC-D" in the ND cache (see FIG. 11).

For example, the address managing unit 65 generates an NA frame including "136," the global unicast address of its own in-vehicle communication device 102, and the MAC address of its own in-vehicle communication device 102 as the message type, the target IPv6 address, and the L2 address, respectively, and transmits the generated NA frame to the subscribing device via the L3 relay unit 51, the L2 switch unit 52, and the communication port 54D.

Also, the address managing unit 65 outputs the registration address information indicating the set of the IP address and the MAC address newly registered in the ND cache, that is, the set of "IPv6-D" and "MAC-D" to the authenticating unit 53.

Upon receiving the registration address information from the address managing unit 65, the authenticating unit 53 generates an authentication IP packet using "IPv6-D" and "MAC-D" indicated by the received registration address information as the destination.

The authenticating unit 53 attempts to authenticate the subscribing device by exchanging the authentication IP packet with the subscribing device via the L3 relay unit 51, the L2 switch unit 52, and the communication port 54D.

Here, the authenticating unit 53 succeeds in authenticating the subscribing device, gives a permission for the L3 relay process for the IP packet from the subscribing device and the IP packet addressed to the subscribing device to the L3 relay unit 51, and gives a notification indicating the authentication result to the address managing unit 65.

Upon receiving the notification indicating that the authentication is successfully performed from the authenticating unit 53, the address managing unit 65 sets the non-revision period of the set from the timing at which the set of "IPv6-D" and "MAC-D" indicated by the registration address information is registered in the ND cache (see FIG. 11) to the timing at which the predetermined period T1 elapses.

Further, when the L3 relay unit 51 uses the set of "IPv6-D" and "MAC-D," the address managing unit 65 extends the end timing of the non-revision period from the timing when the L3 relay unit 51 uses it to the timing after the predetermined period T1 elapses.

[NS Frame from Fake Functional Unit]

For example, the fake functional unit is connected to the communication port 54D in the in-vehicle communication device 102 by the malicious user for the purpose of interrupting the communication between the automated driving ECU 111A and the in-vehicle communication device 102 by pretending to be the automated driving ECU 111A. Here, the MAC address of the fake functional unit is "MAC-X."

The fake functional unit, for example, generates the following NS frame in order to pretend to be the automated driving ECU 111A (see FIG. 10).

That is, the setting values of the transmission destination MAC address and the transmission source MAC address in header field in this NS frame are the MAC address of IPv6 multicast based on the request node multicast address of the in-vehicle communication device 102 and "MAC-X," respectively.

Also, the setting values of the transmission source IPv6 address and the L2 address in the data field are "IPv6-A" and "MAC-X," respectively.

The other setting values are similar to the setting values in the NS frame generated by the subscribing device. The fake functional unit multicasts the generated NS frame.

FIG. 16 is a diagram illustrating an example of the ND cache held in the L3 relay unit in the in-vehicle communication device according to the second embodiment of the present disclosure.

Referring to FIGS. 13 and 16, upon receiving the NS frame from the fake functional unit via the communication port 54D, the L2 switch unit 52, and the L3 relay unit 51, the address managing unit 65 in the in-vehicle communication device 102 recognizes that the relevant NS frame is addressed to itself since the target IPv6 address included in the received NS frame is its own global unicast address.

The address managing unit 65 registers the transmission source IPv6 address, that is, "IPv6-A" and the L2 address, that is, "MAC-X" in the ND cache on the basis of the received NS frame as illustrated in FIG. 16.

Further, the address managing unit 65 outputs the registration address information indicating the set of the IP address and the MAC address newly registered in the ND cache, that is, the set of "IPv6-A" and "MAC-X" to the authenticating unit 53.

In this case, the authenticating unit 53 attempts to authenticate the fake functional unit using "IPv6-A" and "MAC-X" received from address managing unit 65 as the destination but fails in authenticating the functional unit 111 since the fake functional unit is not a legitimate functional unit 11 and gives a notification indicating that the authentication has failed to the address managing unit 65.

Upon receiving the notification indicating that the authentication has failed from the authenticating unit 53, the address managing unit 65 deletes the set of "IPv6-A" and "MAC-X" from the ND cache illustrated in FIG. 16.

Since the correct set of "IPv6-A" and "MAC-A" is registered in the ND cache as described above after the set of "IPv6-A" and "MAC-X" is deleted from the ND cache, the erroneously learned ND cache is reproduced as the correct ND cache.

[Flow of Operation]

Figure 17:
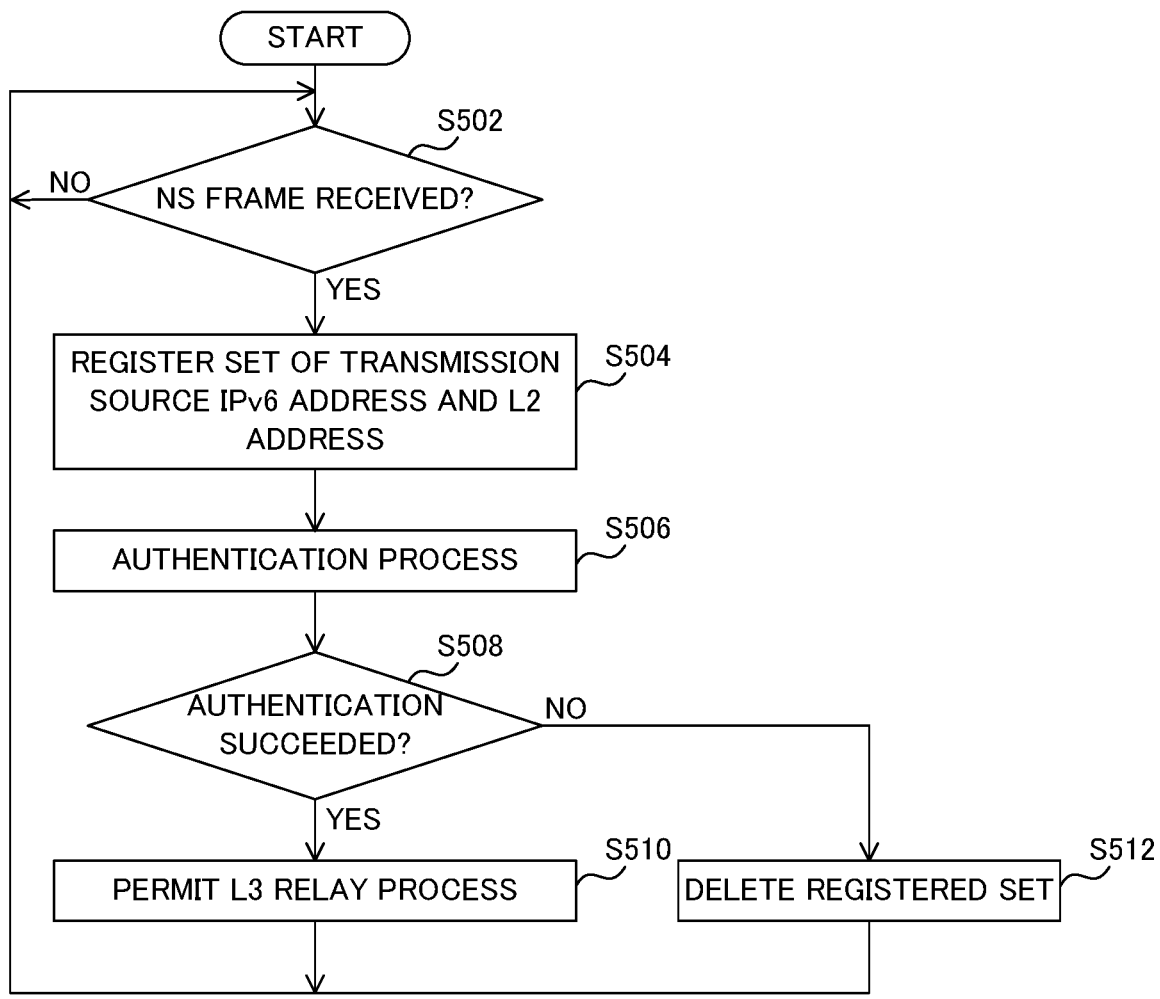
FIG. 17 is a flowchart illustrating an operation procedure when an in-vehicle communication device in a modified example of the in-vehicle communication system according to the second embodiment of the present disclosure processes a received NS frame.

FIG. 17 is a flowchart illustrating an operation procedure when an in-vehicle communication device in a modified example of the in-vehicle communication system according to the second embodiment of the present disclosure processes the received NS frame.

Referring to FIG. 17, first, the in-vehicle communication device 102 performs the relay process of relaying data between the functional units 111 until the NS frame is received (NO at step S502).

Then, upon receiving the NS frame (YES at step S502), the in-vehicle communication device 102 registers the set of the transmission source IPv6 address and the L2 address in the data field of the received NS frame in the ND cache (step S504).

Then, the in-vehicle communication device 102 attempts to authenticate the device by exchanging the authentication IP packet with the device that has transmitted the NS frame using the registered set (step S506).

Then, when the authentication of the device that has transmitted the NS frame fails (NO at step S508), the in-vehicle communication device 102 deletes the registered set from the ND cache, and does not permit the L3 relay process for the IP packet from the device and the IP packet addressed to the device (step S512).

On the other hand, when the authentication of the device that has transmitted the NS frame is successfully performed (YES at step S508), the in-vehicle communication device 102 permits the L3 relay process for the IP packet from the device and the IP packet addressed to the device (step S510).

Then, the in-vehicle communication device 102 performs the relay process until a new NS frame is received (NO at step S502).

Further, when the in-vehicle communication device 102 permits the L3 relay process for the IP packet from the device that has transmitted the NS frame and the IP packet addressed to the device at step S510, the in-vehicle communication device 102 sets the non-revision period in accordance with the operation flow illustrated in FIG. 15.

Further, in the in-vehicle communication device according to the second embodiment of the present disclosure, the address managing unit 65 is configured not to permit the rewriting of the newly registered correspondence relation until the predetermined condition C1 is satisfied after the authentication process for the newly registered functional unit 111 is successfully performed, but the present disclosure is not limited to this example. The address managing unit 65 may be configured to permit the rewriting of the registered correspondence relation even after the authentication process is successfully performed.

Further, in the in-vehicle communication device according to the second embodiment of the present disclosure, the predetermined condition C1 is that the communication of the newly registered functional unit 111 is interrupted for a predetermined period T1 or more, but the present disclosure is not limited to this example. The predetermined condition C1 may be, for example, another condition such as a condition that a predetermined period T2 elapses after the authentication process for the newly registered functional unit 111 is successfully performed.

As described above, the in-vehicle communication device according to the second embodiment of the present disclosure performs the relay process of relaying data between the functional units 111 in the in-vehicle network. The L3 relay unit 51 performs the relay process using the correspondence information indicating the correspondence relation between the IP address and the MAC address of one or more of the functional units 111. The address managing unit 65 generates the correspondence information. The authenticating unit 53 performs the authentication process for the functional unit 111. The functional unit 111 performs the authentication process for the functional unit 111 in which the IP address and the MAC address are newly registered in the correspondence information by the address managing unit 65. Further, when the authentication process for the newly registered functional unit 111 is not successfully performed, the address managing unit 65 deletes the correspondence relation of the functional unit 111 from the correspondence information.

When the authentication process for the newly registered functional unit 111 is not successfully performed, the functional unit 111 is considered to be an unauthorized functional unit 111. With the above configuration, for example, even when the unauthorized functional unit 111 pretended to be a legitimate functional unit 111, and an erroneous correspondence relation is registered in the correspondence information, it is possible to delete the erroneous correspondence relation from the correspondence information, and it is possible to prevent the relay process using the erroneous correspondence relation from being continued. Accordingly, the data from the functional unit 111 can be relayed correctly. Therefore, the satisfactory communication can be provided in the in-vehicle network.

Further, in the in-vehicle communication device according to the second embodiment of the present disclosure, the address managing unit 65 does not permit the rewriting of the newly registered correspondence relation until the predetermined condition C1 is satisfied after the authentication process for the newly registered functional unit 111 is successfully performed.

When the authentication process for the newly registered functional unit 111 is successfully performed, the functional unit 111 is considered to be a legitimate functional unit 111. With the above configuration, since the newly registered correct correspondence relation can be protected until the predetermined condition C1 is satisfied, the relay process using the correct correspondence relation can be continued until at least the predetermined condition C1 is satisfied.

Further, in the in-vehicle communication device according to the second embodiment of the present disclosure, the predetermined condition C1 is a condition that the communication of the newly registered functional unit 111 is interrupted for the predetermined period T1 or more.

With such a configuration, it is possible to continue the data relay process of the legitimate functional unit 111 using the correct correspondence relation while the communication with the newly registered legitimate functional unit 111 is being continued.

Further, the in-vehicle communication device according to the second embodiment of the present disclosure performs the relay process of relaying data between the functional units 111 in the in-vehicle network. The L3 relay unit 51 performs the relay process using the correspondence information indicating the correspondence relation between the IP address and the MAC address of one or more of the functional units 111. The address managing unit 65 generates the correspondence information. The authenticating unit 53 performs the authentication process for the functional unit 111. The functional unit 111 performs the authentication process for the functional unit 111 in which the IP address and the MAC address are newly registered in the correspondence information by the address managing unit 65. Then, after the authentication process for the newly registered functional unit 111 is successfully performed, the address managing unit 65 does not permit the rewriting of the newly registered correspondence relation until the predetermined condition C1 is satisfied.

When the authentication process for the newly registered functional unit 111 is successfully performed, the functional unit 111 is considered to be a legitimate functional unit 111. With the above configuration, since the newly registered correct correspondence relation can be protected until the predetermined condition C1 is satisfied, the relay process using the correct correspondence relation can be continued until at least the predetermined condition C1 is satisfied. Accordingly, the data from the functional unit 111 can be relayed correctly. Therefore, the satisfactory communication can be provided in the in-vehicle network.

The other configurations and operations are similar to those of the in-vehicle communication device according to the first embodiment, and thus detailed description will not be repeated here.

Further, some or all of the components and operations of the respective devices according to the first and second embodiments of the present disclosure may be combined appropriately.

Specifically, in the in-vehicle communication device according to the second embodiment of the present disclosure, the address managing unit 65 registers the correspondence relation between the transmission source IP address and the transmission source MAC address included in the data field of the layer 2 frame received from the functional unit 111 via the L3 relay unit 51 in the correspondence information. Then, when the transmission source MAC address and the transmission source MAC address included in the header of the frame do not coincide with each other, the address managing unit 65 does not register the correspondence relation in the correspondence information or deletes the correspondence relation from the correspondence information.

When the transmission source MAC address included in the data field does not coincide with the transmission source MAC address included in the header, the frame is likely to be an unauthorized frame. With the above configuration, it is possible to prevent the erroneous correspondence relation between the transmission source IP address and the transmission source MAC address included in the data field of the unauthorized frame from continuing to be registered in the correspondence information, and thus it is possible to prevent the relay process using the erroneous correspondence relation from continuing.

The above embodiments should be considered as illustrative in all points and not restrictive. The scope of the present disclosure is illustrated not by the above description but by claims set forth below and are intended to include meaning equivalent to claims set forth below and all modifications within the scope.

The above description includes the features described below.

[Additional Note 1]

An in-vehicle communication device that performs a relay process of relaying data between functional units in an in-vehicle network, comprising:

a communication unit that performs the relay process using correspondence information indicating a correspondence relation between an Internet protocol (IP) address and a media access control (MAC) address of one or more functional units;

an address managing unit that generates the correspondence information; and an authenticating unit that performs an authentication process for the functional unit, wherein the authenticating unit performs the authentication process for the functional unit in which an IP address and a MAC address are newly registered in the correspondence information by the address managing unit, the address managing unit deletes the correspondence relation of the functional unit from the correspondence information when the authentication process for the newly registered functional unit is not successfully performed, the functional unit is an automated driving electronic control unit (ECU), a sensor, a navigation device, a telematics communication unit (TCU), a human machine interface or a camera, the in-vehicle communication device is an in-vehicle gateway device, the corresponding information is an address resolution protocol (ARP) table or a neighbor discovery (ND) cache, and the communication unit performs the relay process using the ARP table in accordance with an IPv4 protocol or performs the relay process using the ND cache in accordance with an IPv6 protocol.

[Additional Note 2]

An in-vehicle communication device that performs a relay process of relaying data between functional units in an in-vehicle network, comprising:

a communication unit that performs the relay process using correspondence information indicating a correspondence relation between an IP address and a MAC address of one or more functional units; and an address managing unit that generates the correspondence information, wherein the address managing unit registers a correspondence relation between a transmission source IP address and a transmission source MAC address included in a data field of a frame of a layer 2 received from the functional unit via the communication unit in the correspondence information, the address managing unit does not register the correspondence relation in the correspondence information or deletes the correspondence relation from the correspondence information when the transmission source MAC address does not coincide with a transmission source MAC address included in a header of the frame, the functional unit is an automated driving ECU, a sensor, a navigation device, a TCU, a human machine interface, or a camera, the in-vehicle communication device is an in-vehicle gateway device, the correspondence information is an ARP table or an ND cache, the communication unit performs the relay process using the ARP table in accordance with an IPv4 protocol or performs the relay process using the ND cache in accordance with an IPv6 protocol. the address managing unit registers a correspondence relation between a transmission source protocol address and a transmission source hardware address included in a data field of an ARP request frame received from the functional unit via the communication unit in the correspondence information in accordance with the IPv4 protocol or registers a correspondence relationship between a transmission source IPv6 address and a layer 2 (L2) address included in a data field of a neighbor solicitation (NS) frame received from the functional unit via the communication unit in the corresponding information in accordance with the IPv6 protocol, and when the transmission source hardware address or the L2 address does not coincide with the transmission source MAC address included in the header, the address managing unit does not register the correspondence relation in the correspondence information or deletes the correspondence information from the correspondence information.

[Additional Note 3]

An in-vehicle communication device that performs a relay process of relaying data between functional units in an in-vehicle network, comprising:

a communication unit that performs the relay process using correspondence information indicating a correspondence relation between an IP address and a MAC address of one or more functional units;

an address managing unit that generates the correspondence information; and an authenticating unit that performs an authentication process for the functional unit, wherein the authenticating unit performs the authentication process for the functional unit in which an IP address and a MAC address are newly registered in the correspondence information by the address managing unit, the address managing unit does not permit rewriting of the newly registered correspondence relation until a predetermined condition is satisfied after the authentication process for the newly registered functional unit is successfully performed, the functional unit is an automated driving ECU, a sensor, a navigation device, a TCU, a human machine interface, or a camera, the in-vehicle communication device is an in-vehicle gateway device, the correspondence information is an ARP table or an ND cache, and the communication unit performs the relay process using the ARP table in accordance with an IPv4 protocol or performs the relay process using the ND cache in accordance with an IPv6 protocol.

It is to be noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An in-vehicle communication device that performs a relay process of relaying data between functional units in an in-vehicle network, comprising:
   a communication unit that performs the relay process using correspondence information indicating a correspondence relation between an Internet protocol (IP) address and a media access control (MAC) address of one or more functional units;
   an address managing unit that generates the correspondence information; and
   an authenticating unit that performs an authentication process for the functional unit,
   wherein the authenticating unit performs the authentication process for the functional unit in which an IP address and a MAC address are newly registered in the correspondence information by the address managing unit, and
   the address managing unit maintains the correspondence relation of the functional unit in the correspondence information when the authentication process for the newly registered functional unit is successfully performed, and deletes the correspondence relation of the functional unit from the correspondence information when the authentication process for the newly registered functional unit is not successfully performed.

2. The in-vehicle communication device according to claim 1, wherein the address managing unit registers a correspondence relation between a transmission source IP address and a transmission source MAC address included in a data field of a frame of a layer 2 received from the functional unit via the communication unit in the correspondence information, and
   the address managing unit does not register the correspondence relation in the correspondence information or deletes the correspondence relation from the correspondence information when the transmission source MAC address does not coincide with a transmission source MAC address included in a header of the frame.

3. The in-vehicle communication device according to claim 1, wherein the address managing unit does not permit rewriting of the newly registered correspondence relation until a predetermined condition is satisfied after the authentication process for the newly registered functional unit is successfully performed.

4. The in-vehicle communication device according to claim 3, wherein the predetermined condition is a condition that communication of the newly registered functional unit is interrupted for a predetermined period or more.

5. An in-vehicle communication device that performs a relay process of relaying data between functional units in an in-vehicle network, comprising:
   a communication unit that performs the relay process using correspondence information indicating a correspondence relation between an IP address and a MAC address of one or more functional units; and
   an address managing unit that generates the correspondence information,
   wherein the address managing unit registers a correspondence relation between a transmission source IP address and a transmission source MAC address included in a data field of a frame of a layer 2 received from the functional unit via the communication unit in the correspondence information, and
   the address managing unit does not register the correspondence relation in the correspondence information or deletes the correspondence relation from the correspondence information when the transmission source MAC address does not coincide with a transmission source MAC address included in a header of the frame.

6. An in-vehicle communication device that performs a relay process of relaying data between functional units in an in-vehicle network, comprising:
   a communication unit that performs the relay process using correspondence information indicating a correspondence relation between an IP address and a MAC address of one or more functional units;
   an address managing unit that generates the correspondence information; and
   an authenticating unit that performs an authentication process for the functional unit,
   wherein the authenticating unit performs the authentication process for the functional unit in which an IP address and a MAC address are newly registered in the correspondence information by the address managing unit, and
   the address managing unit does not permit rewriting of the newly registered correspondence relation until a predetermined condition is satisfied after the authentication process for the newly registered functional unit is successfully performed.

7. A communication control method in an in-vehicle communication device that performs a relay process of relaying data between functional units in an in-vehicle network, comprising:
   performing the relay process using correspondence information indicating a correspondence relation between an IP address and a MAC address of one or more functional units;
   generating the correspondence information; and
   performing an authentication process for the functional unit,
   wherein, in the generating the correspondence information, an IP address and a MAC address are newly registered in the correspondence information,
   in the performing the authentication process, the authentication process is performed for the functional unit in which an IP address and a MAC address are newly registered in the correspondence information, and the communication control method further comprises:
  maintaining the correspondence relation of the functional unit in the correspondence information when the authentication process for the newly registered functional unit is successfully performed, and
  deleting the correspondence relation of the functional unit from the correspondence information when the authentication process for the newly registered functional unit is not successfully performed.

8. A communication control method in an in-vehicle communication device that performs a relay process of relaying data between functional units in an in-vehicle network, comprising:
  performing the relay process using correspondence information indicating a correspondence relation between an IP address and a MAC address of one or more functional units; and
  generating the correspondence information,
  wherein, in the generating the correspondence information, a correspondence relation between a transmission source IP address and a transmission source MAC address included in a data field of a frame of a layer 2 received from the functional unit is registered in the correspondence information, and
  the communication control method further comprises not registering the correspondence relation in the correspondence information or deleting the correspondence relation from the correspondence information when the transmission source MAC address does not coincide with a transmission source MAC address included in a header of the frame.

9. A communication control method in an in-vehicle communication device that performs a relay process of relaying data between functional units in an in-vehicle network, comprising:
  performing the relay process using correspondence information indicating a correspondence relation between an IP address and a MAC address of one or more functional units;
  generating the correspondence information; and
  performing an authentication process for the functional unit,
  wherein, in the generating the correspondence information, an IP address and a MAC address are newly registered in the correspondence information,
  in the performing the authentication process, the authentication process is performed for the functional unit in which an IP address and a MAC address are newly registered in the correspondence information, and
  the communication control method further comprises not permitting rewriting of the newly registered correspondence relation until a predetermined condition is satisfied after the authentication process for the newly registered functional unit is successfully performed.

* * * * *